(12) United States Patent
Bestaoui-Spurr et al.

(10) Patent No.: US 9,938,811 B2
(45) Date of Patent: *Apr. 10, 2018

(54) METHOD OF ENHANCING FRACTURE COMPLEXITY USING FAR-FIELD DIVERT SYSTEMS

(71) Applicant: Baker Hughes, LLC, Houston, TX (US)

(72) Inventors: Naima Bestaoui-Spurr, The Woodlands, TX (US); Ahmed M. Gomaa, Tomball, TX (US); Harold Gene Hudson, The Woodlands, TX (US); D. V. Satyanarayana Gupta, The Woodlands, TX (US); Scott Gregory Nelson, Cypress, TX (US); Harold Dean Brannon, Magnolia, TX (US)

(73) Assignee: Baker Hughes, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/217,684

(22) Filed: Jul. 22, 2016

(65) Prior Publication Data

US 2017/0051599 A1 Feb. 23, 2017

Related U.S. Application Data

(63) Continuation-in-part of application No. 14/512,232, filed on Oct. 10, 2014, which is a continuation-in-part
(Continued)

(51) Int. Cl.
*E21B 43/267* (2006.01)
*E21B 43/14* (2006.01)
(Continued)

(52) U.S. Cl.
CPC .......... *E21B 43/267* (2013.01); *C09K 8/506* (2013.01); *C09K 8/5086* (2013.01); *C09K 8/516* (2013.01);
(Continued)

(58) Field of Classification Search
None
See application file for complete search history.

(56) References Cited

U.S. PATENT DOCUMENTS 2,596,843 A    5/1952   Farris
2,735,269 A    2/1956   Carpenter et al.
(Continued)

FOREIGN PATENT DOCUMENTS

CA    2329834 A1    6/2002
EP    0308257 A2    3/1989
(Continued)

OTHER PUBLICATIONS

Nitters et al. "Granular Diverting Agents Selection, Design and Performance" SPE 18884, 1989.*
(Continued)

*Primary Examiner* — William D Hutton, Jr.
*Assistant Examiner* — Charles R Nold
(74) *Attorney, Agent, or Firm* — John Wilson Jones; Jones Delflache LLP

(57) ABSTRACT

The flow of well treatment fluids may be diverted from a high permeability zone to a low permeability zone within a fracture network within a subterranean formation by use of a divert system comprising dissolvable diverter particulates and proppant. At least a portion of the high permeability zone is propped open with the proppant of the divert system and at least a portion of the high permeability zone is blocked with the diverter particulates. A fluid is then pumped into the subterranean formation and into a lower permeabil-
(Continued)

ity zone of the formation farther from the wellbore. The diverter particulates in the high permeability zones may then be dissolved at in-situ reservoir conditions and hydrocarbons produced from the high permeability propped zones of the fracture network. The divert system has particular applicability in the enhancement of production or hydrocarbons from high permeability zones in a fracture network located far field from the wellbore.

23 Claims, 13 Drawing Sheets

Related U.S. Application Data of application No. 14/461,123, filed on Aug. 15, 2014, which is a continuation-in-part of application No. 13/928,006, filed on Jun. 26, 2013.

(51) Int. Cl.

| | |
|---|---|
| *E21B 33/138* | (2006.01) |
| *C09K 8/516* | (2006.01) |
| *C09K 8/508* | (2006.01) |
| *C09K 8/536* | (2006.01) |
| *C09K 8/506* | (2006.01) |
| *C09K 8/68* | (2006.01) |
| *C09K 8/70* | (2006.01) |
| *C09K 8/76* | (2006.01) |
| *C09K 8/86* | (2006.01) |
| *C09K 8/88* | (2006.01) |
| *C09K 8/92* | (2006.01) |
| *C09K 8/80* | (2006.01) |

(52) U.S. Cl.
CPC ............ *C09K 8/68* (2013.01); *C09K 8/70* (2013.01); *C09K 8/76* (2013.01); *C09K 8/80* (2013.01); *C09K 8/86* (2013.01); *C09K 8/885* (2013.01); *C09K 8/92* (2013.01); *E21B 33/138* (2013.01); *E21B 43/14* (2013.01)

(56) References Cited

U.S. PATENT DOCUMENTS

| | | |
|---|---|---|
| 2,966,457 A | 12/1960 | Starmann et al. |
| 3,089,542 A | 5/1963 | Kolodny |
| 3,127,937 A | 4/1964 | McGuire, Jr. et al. |
| 3,149,673 A | 9/1964 | Pennington |
| 3,149,674 A | 9/1964 | Schultze et al. |
| 3,151,678 A | 10/1964 | Hanson et al. |
| 3,159,217 A | 12/1964 | Hanson |
| 3,175,615 A | 3/1965 | East |
| 3,254,717 A | 6/1966 | Huitt et al. |
| 3,266,573 A | 8/1966 | Rixe |
| 3,335,796 A | 8/1967 | Parker, Jr. |
| 3,335,797 A | 8/1967 | Braunlich, Jr. |
| 3,372,752 A | 3/1968 | Prater |
| 3,399,727 A | 9/1968 | Graham et al. |
| 3,480,084 A | 11/1969 | Eilers |
| 3,492,147 A | 1/1970 | Young et al. |
| 3,497,008 A | 2/1970 | Graham et al. |
| 3,659,651 A | 5/1972 | Graham |
| 3,709,300 A | 1/1973 | Pye |
| 3,888,311 A | 6/1975 | Cooke, Jr. |
| 3,929,191 A | 12/1975 | Graham et al. |
| 3,937,283 A | 2/1976 | Blauer et al. |
| 3,954,142 A | 5/1976 | Broaddus et al. |
| 4,051,900 A | 10/1977 | Hankins |
| 4,074,760 A | 2/1978 | Copeland et al. |
| 4,078,609 A | 3/1978 | Pavlich |
| 4,078,610 A | 3/1978 | Arnold |
| 4,195,010 A | 3/1980 | McClinton et al. |
| 4,216,829 A | 8/1980 | Murphey |
| 4,421,167 A | 12/1983 | Erbstoesser et al. |
| 4,439,489 A | 3/1984 | Johnson et al. |
| 4,444,264 A | 4/1984 | Dill |
| 4,462,466 A | 7/1984 | Kachnik |
| 4,493,875 A | 1/1985 | Beck |
| 4,502,967 A | 3/1985 | Conway |
| 4,506,734 A | 3/1985 | Nolte |
| 4,509,598 A | 4/1985 | Earl et al. |
| 4,547,468 A | 10/1985 | Jones et al. |
| 4,585,064 A | 4/1986 | Graham et al. |
| 4,632,876 A | 12/1986 | Laird et al. |
| 4,654,266 A | 3/1987 | Kachnik |
| 4,680,230 A | 7/1987 | Gibb et al. |
| 4,717,594 A | 1/1988 | Graham et al. |
| 4,733,729 A | 3/1988 | Copeland |
| 4,796,701 A | 1/1989 | Hudson et al. |
| 4,829,100 A | 5/1989 | Murphey et al. |
| 4,830,794 A | 5/1989 | Edgley et al. |
| 4,840,729 A | 6/1989 | Levine |
| 4,850,430 A | 7/1989 | Copeland et al. |
| 4,869,960 A | 9/1989 | Gibb et al. |
| 4,875,525 A | 10/1989 | Mana |
| 4,887,670 A | 12/1989 | Lord et al. |
| 4,888,240 A | 12/1989 | Graham et al. |
| 4,895,207 A | 1/1990 | Friedman |
| 4,921,820 A | 5/1990 | Rumpf et al. |
| 4,921,821 A | 5/1990 | Rumpf et al. |
| 4,923,714 A | 5/1990 | Gibb et al. |
| 4,969,523 A | 11/1990 | Martin et al. |
| 5,069,283 A | 12/1991 | Mack |
| 5,074,359 A | 12/1991 | Schmidt |
| 5,103,905 A | 4/1992 | Brannon et al. |
| 5,175,133 A | 12/1992 | Smith et al. |
| 5,240,654 A | 8/1993 | Smith et al. |
| 5,305,832 A | 4/1994 | Gupta et al. |
| 5,330,005 A | 7/1994 | Card et al. |
| 5,333,689 A | 8/1994 | Jones et al. |
| 5,422,183 A | 6/1995 | Sinclair et al. |
| 5,425,421 A | 6/1995 | Coleman et al. |
| 5,435,391 A | 7/1995 | Jones |
| 5,439,055 A | 8/1995 | Card |
| 5,443,633 A | 8/1995 | Hirsbrunner et al. |
| 5,492,178 A | 2/1996 | Nguyen |
| 5,501,273 A | 3/1996 | Puri |
| 5,515,920 A | 5/1996 | Luk |
| 5,531,274 A | 7/1996 | Bienvenu, Jr. |
| 5,547,506 A | 8/1996 | Rae et al. |
| 5,582,249 A | 12/1996 | Caveny et al. |
| 5,582,250 A | 12/1996 | Constein |
| 5,597,784 A | 1/1997 | Sinclair et al. |
| 5,604,184 A | 2/1997 | Ellis et al. |
| 5,699,860 A | 12/1997 | Grundmann |
| 5,799,734 A | 9/1998 | Norman et al. |
| 5,837,656 A | 11/1998 | Sinclair et al. |
| 5,908,073 A | 6/1999 | Nguyen et al. |
| 5,916,933 A | 6/1999 | Johnson et al. |
| 5,921,317 A | 7/1999 | Dewprashad et al. |
| 5,924,488 A | 7/1999 | Nguyen et al. |
| 5,948,734 A | 9/1999 | Sinclair et al. |
| 5,950,727 A | 9/1999 | Irani |
| 5,955,144 A | 9/1999 | Sinclair et al. |
| 5,960,878 A | 10/1999 | Nguyen et al. |
| 5,964,289 A | 10/1999 | Hill |
| 5,964,291 A | 10/1999 | Bourne et al. |
| 6,047,772 A | 4/2000 | Weaver et al. |
| 6,059,034 A | 5/2000 | Rickards et al. |
| 6,070,666 A | 6/2000 | Montgomery |
| 6,079,492 A | 6/2000 | Hoogteerjiling et al. |
| 6,114,410 A | 9/2000 | Betzold |
| 6,116,342 A | 9/2000 | Clark et al. |
| 6,138,760 A | 10/2000 | Lopez et al. |
| 6,169,058 B1 | 1/2001 | Le et al. |
| 6,172,011 B1 | 1/2001 | Card et al. |
| 6,194,355 B1 | 2/2001 | Jarrett et al. |
| 6,209,643 B1 | 4/2001 | Nguyen et al. |
| 6,211,120 B1 | 4/2001 | Welch et al. |
| 6,248,838 B1 | 6/2001 | Albright |
| 6,311,773 B1 | 11/2001 | Todd et al. |

(56) References Cited

U.S. PATENT DOCUMENTS

| | | |
|---|---|---|
| 6,315,041 B1 | 11/2001 | Carlisle |
| 6,328,105 B1 | 12/2001 | Betzold |
| 6,330,916 B1 | 12/2001 | Rickards et al. |
| 6,348,629 B1 | 2/2002 | Albright |
| 6,364,018 B1 | 4/2002 | Brannon et al. |
| 6,367,548 B1 | 4/2002 | Purvis et al. |
| 6,372,678 B1 | 4/2002 | Youngman et al. |
| 6,399,546 B1 | 6/2002 | Chang et al. |
| 6,406,789 B1 | 6/2002 | McDaniel et al. |
| 6,439,309 B1 | 8/2002 | Matherly et al. |
| 6,439,310 B1 | 8/2002 | Scott, III et al. |
| 6,451,953 B1 | 9/2002 | Albright |
| 6,491,099 B1 | 12/2002 | Di Lullo Arias et al. |
| 6,503,676 B2 | 1/2003 | Yamashita et al. |
| 6,508,305 B1 | 1/2003 | Brannon et al. |
| 6,528,157 B1 | 3/2003 | McDaniel et al. |
| 6,541,579 B2 | 4/2003 | Albright |
| 6,579,947 B2 | 6/2003 | Heitz et al. |
| 6,582,819 B2 | 6/2003 | McDaniel et al. |
| 6,632,527 B1 | 10/2003 | McDaniel |
| 6,640,897 B1 | 11/2003 | Misselbrook et al. |
| 6,667,261 B1 | 12/2003 | Anshits et al. |
| 6,766,817 B2 | 1/2004 | da Silva |
| 6,705,400 B1 | 3/2004 | Nguyen et al. |
| 6,725,931 B2 | 4/2004 | Nguyen et al. |
| 6,742,590 B1 | 6/2004 | Nguyen |
| 6,749,025 B1 | 6/2004 | Brannon et al. |
| 6,772,838 B2 | 8/2004 | Dawson et al. |
| 6,776,235 B1 | 8/2004 | England |
| 6,830,105 B2 | 12/2004 | Theising |
| 6,892,813 B2 | 5/2005 | Nguyen et al. |
| 7,001,872 B2 | 2/2006 | Pyecroft et al. |
| 7,036,590 B2 | 5/2006 | Harris |
| 7,036,591 B2 | 5/2006 | Canan et al. |
| 7,036,597 B2 | 5/2006 | O'Brien et al. |
| 7,044,220 B2 | 5/2006 | Nguyen et al. |
| 7,066,258 B2 | 6/2006 | Justus et al. |
| 7,086,460 B2 | 8/2006 | Nguyen et al. |
| 7,153,575 B2 | 12/2006 | Anderson et al. |
| 7,207,386 B2 | 4/2007 | Brannon et al. |
| 7,210,528 B1 | 5/2007 | Brannon et al. |
| 7,213,651 B2 | 5/2007 | Brannon et al. |
| 7,226,971 B2 | 6/2007 | Ramesh et al. |
| 7,270,879 B2 | 9/2007 | McCrary |
| 7,271,133 B2 | 9/2007 | Weaver et al. |
| 7,303,018 B2 | 12/2007 | Cawiezel et al. |
| 7,350,572 B2 | 4/2008 | Fredd et al. |
| 7,361,693 B2 | 4/2008 | Albright et al. |
| 7,426,961 B2 | 9/2008 | Stephenson et al. |
| 7,638,468 B2 | 12/2009 | Gupta |
| 7,726,399 B2 | 6/2010 | Brannon et al. |
| 7,913,762 B2 | 3/2011 | Wheeler et al. |
| 8,061,424 B2 | 11/2011 | Willberg et al. |
| 8,173,581 B2 | 5/2012 | Huang |
| 8,936,085 B2 | 1/2015 | Boney et al. |
| 2002/0023752 A1 | 2/2002 | Qu et al. |
| 2003/0050432 A1 | 3/2003 | Ramesh et al. |
| 2003/0224165 A1 | 12/2003 | Anderson et al. |
| 2004/0023812 A1 | 2/2004 | England et al. |
| 2004/0023818 A1 | 2/2004 | Nguyen et al. |
| 2004/0040708 A1 | 3/2004 | Stephenson et al. |
| 2004/0072700 A1 | 4/2004 | Gupta et al. |
| 2004/0224165 A1 | 12/2004 | Barron et al. |
| 2004/0244978 A1 | 12/2004 | Shaarpour |
| 2004/0261996 A1 | 12/2004 | Munoz et al. |
| 2005/0016732 A1 | 1/2005 | Brannon et al. |
| 2005/0028976 A1 | 2/2005 | Nguyen |
| 2005/0028979 A1 | 2/2005 | Brannon et al. |
| 2005/0059558 A1 | 3/2005 | Blauch et al. |
| 2005/0089631 A1 | 4/2005 | Nguyen et al. |
| 2005/0130848 A1 | 6/2005 | Todd et al. |
| 2005/0244641 A1 | 11/2005 | Vinvent |
| 2005/0272612 A1 | 12/2005 | Dawson et al. |
| 2005/0274523 A1 | 12/2005 | Brannon et al. |
| 2006/0073980 A1 | 4/2006 | Brannon et al. |
| 2006/0185848 A1 | 8/2006 | Surjaatmadja et al. |
| 2008/0139416 A1 | 6/2008 | Rimassa et al. |
| 2008/0179057 A1 | 7/2008 | Dawson |
| 2010/0200235 A1 | 8/2010 | Luo et al. |
| 2010/0263866 A1 | 10/2010 | Huang et al. |
| 2011/0180259 A1 | 7/2011 | Willberg et al. |
| 2012/0024530 A1 | 2/2012 | Todd et al. |
| 2012/0073809 A1 | 3/2012 | Clum et al. |
| 2012/0085536 A1 | 4/2012 | Alboudwarej et al. |
| 2012/0267102 A1 | 10/2012 | Huang et al. |
| 2012/0285692 A1* | 11/2012 | Potapenko ............ E21B 21/003 166/308.1 |
| 2013/0168096 A1 | 7/2013 | Parkhonyuk et al. |
| 2013/0341025 A1 | 12/2013 | Gupta |
| 2014/0178325 A1 | 6/2014 | Martinez-Castro et al. |
| 2014/0299318 A1 | 10/2014 | Crews et al. |
| 2014/0352959 A1 | 12/2014 | Nelson et al. |
| 2015/0041132 A1 | 2/2015 | Nelson et al. |
| 2015/0047838 A1* | 2/2015 | Lecerf ................... E21B 33/134 166/255.1 |
| 2015/0129214 A1 | 5/2015 | Boney et al. |
| 2015/0233226 A1* | 8/2015 | Holzhauser ........... E21B 43/267 166/280.1 |
| 2015/0330197 A1 | 11/2015 | Brannon et al. |
| 2017/0159402 A1 | 6/2017 | Nelson et al. |

FOREIGN PATENT DOCUMENTS

| | | |
|---|---|---|
| EP | 0773343 A2 | 5/1997 |
| EP | 1023382 BI | 8/2006 |
| GB | 2319796 A | 6/1998 |
| WO | 0005302 A1 | 2/2000 |
| WO | 0166908 A2 | 9/2001 |
| WO | 0226656 A1 | 4/2002 |
| WO | 2004083600 A1 | 9/2004 |
| WO | 2011018257 A1 | 2/2011 |

OTHER PUBLICATIONS

Spectra Chemical Catalog, 2013, pp. 1-46.*
Frank F. Chang, Xiandong Qiu, Hisham A. Nasr-El-Din; "Chemical Diversion Techniques Used for Carbonate Matrix Acidizing: An Overview and Case Histories" 2007 SPE International Symposium on Oilfield Chemistry; SPE 106444; Feb. 28-Mar. 2, 2007; Houston, Texas.
Dave Allison; "Accessfrac Service Diversion Technology"; HO9034; Jan. 30, 2011; 45 pages; Haliburton Energy Services.
Halliburton; "AccessFrac Stimulation Service: Enhanced Proppant Distribution Provides Improved Access to Complex Fracture Networks in Shale Formations"; H08720; Nov. 2011; 2 pages; Haliburton Production Enhancement.
Savari et al, "Improved Lost Circulation Treatment Design and Testing Techniques Minimize Formation Damage", SPE 143603, The Netherlands, Jun. 7-10, 2011.
Wood et al.; Ultra-Lightweight Proppant Development Yields Exciting New Opportunities in Hydraulic Fracturing Design; SPE 84309; Society of Petroleum Engineers. Inc; 2003.
Gupta et al, "The History and Success of Liquid CO2 and CO2/N2 Fracturing System", SPE 40016; Society of Petroleum Engineers, Inc., Mar. 15-18, 1998.
International Search Report and Written Opinion, International Application No. PCT/US2017/042397, dated Oct. 20, 2017.
Nitters et al., "Granular Diverting Agents Selection, Design, and Performance" Society of Petroleum Engineers, SPE 18884, Mar. 13-14, 1989.
Glasbergen, et al., "Design and Field Testing of a Truly Novel Diverting Agent", Society of Petroleum Engineeers, SPE102606, Sep. 24-27, 2006.
Solares, et al., "Successful Application of Innovative Fiber-Diverting Technology Achieved Effective Diversion in Acid Stimulation Treatments in Saudi Arabian Deep Gas Producers", Society of Petroleum Engineers, SPE 115528, Oct. 20-22, 2008.
Chellappah, et al., "A New Outlook on the Ideal Packing Theory for Bridging solids", Society of Petroleum Engineers, SPE 151636, Feb. 16-17, 2012.

(56) References Cited

OTHER PUBLICATIONS

Savari et al., "Engineered LCM Design Yields Novel Activating Material for Potential Application in Severe Lost Circulation Scenarios", Society of Petroleum Engineers, SPE 164748, Apr. 15-17, 2013.

Kaageson-Loe et al., "Particulate-Based Loss-Prevention Material-The secrets of Fracture Sealing Revealed", Society of Petroleum Engineers, SPE 112595, Dec. 2009.

Reddy, et al., "Activator Development for Controlling Degradation Rates of Polymeric Diverting Agents", Society of Petroleum Engineers, SPE 164117, Feb. 2014.

* cited by examiner

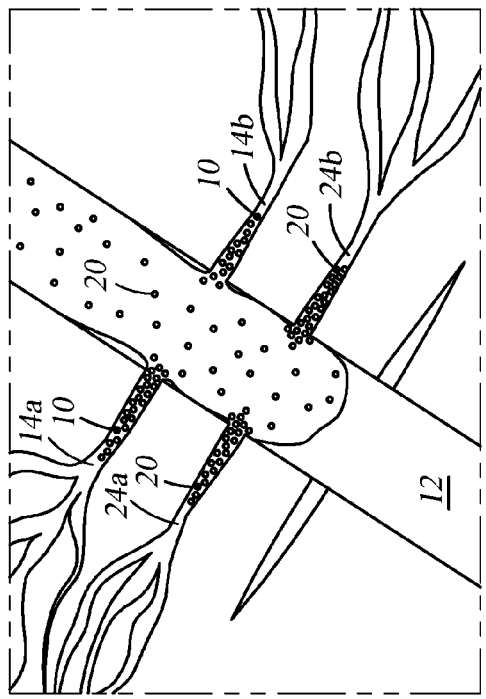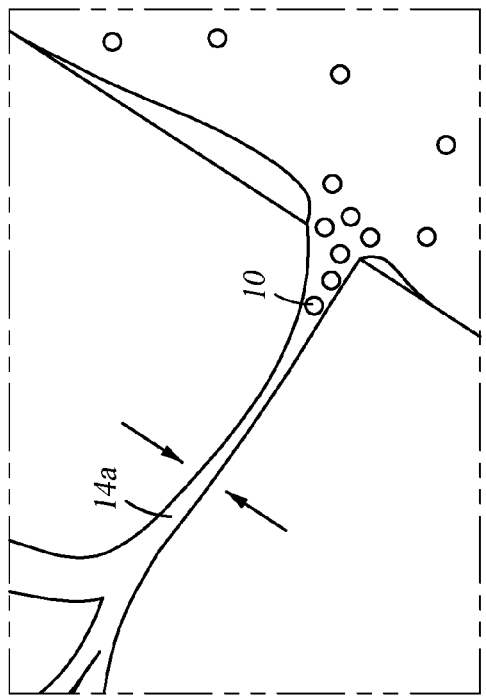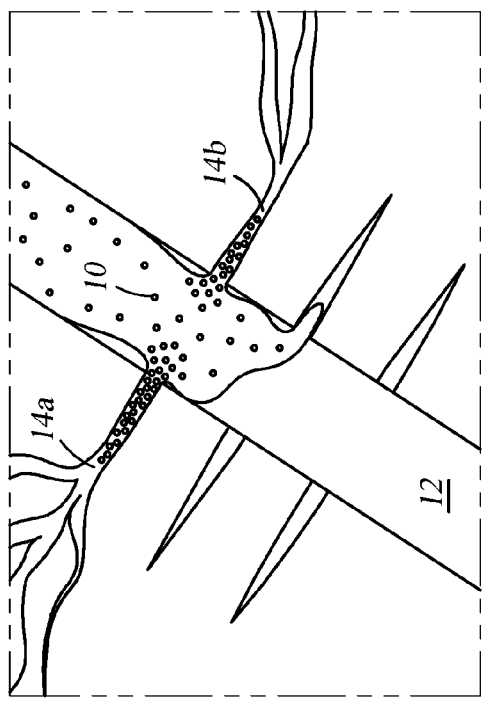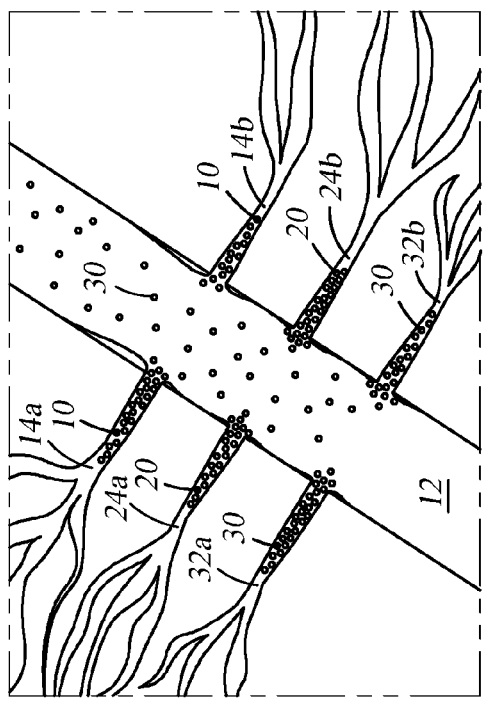
Fig. 2A
Fig. 2B
Fig. 2C
Fig. 2D

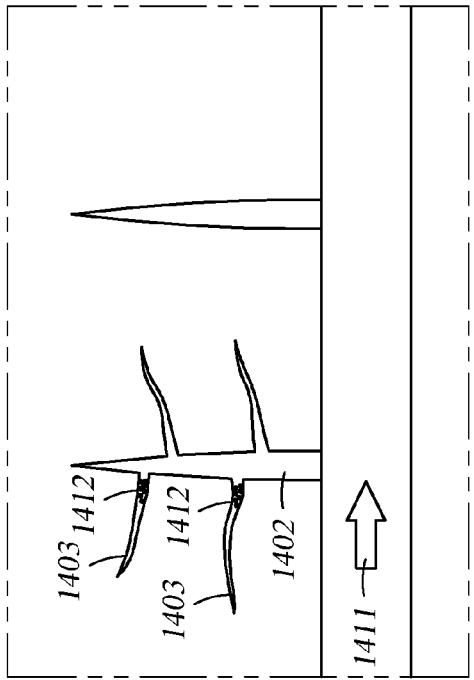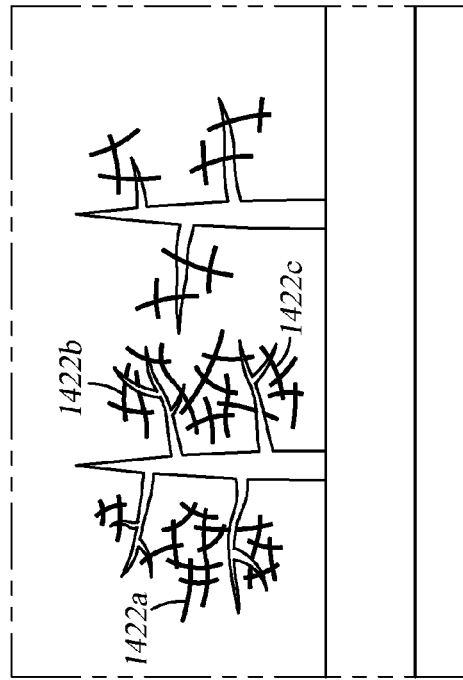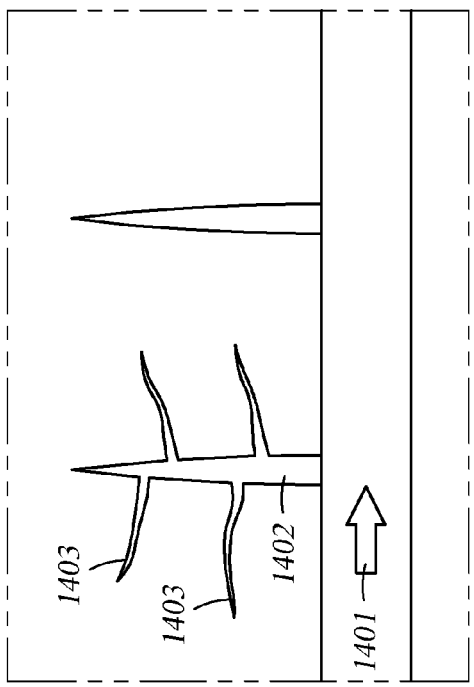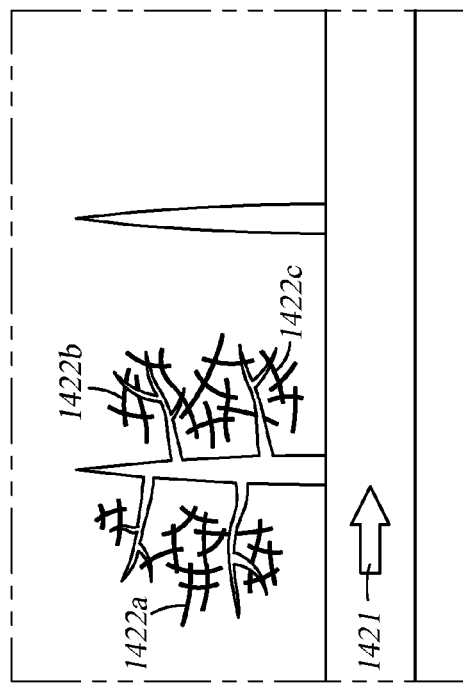

0.12" SLOT 0.20" SLOT 0.04" SLOT 0.20" PERFORATION 0.08" SLOT 0.4" PERFORATION

METHOD OF ENHANCING FRACTURE COMPLEXITY USING FAR-FIELD DIVERT SYSTEMS

This application is a continuation-in-part application of U.S. patent application Ser. No. 14/512,232 filed on Feb. 19, 2015, which is a continuation-in-part application of U.S. patent application Ser. No. 14/461,123 filed on Aug. 15, 2014, which is a continuation-in-part application of U.S. patent application Ser. No. 13/928,006 filed on Jun. 26, 2013, all of which are herein incorporated by reference.

FIELD OF THE DISCLOSURE

The disclosure relates to use of a diversion system to enhance the production of hydrocarbons from high permeability zones of a fracture network near a wellbore and far field from the wellbore. The diversion system contains a mixture of a dissolvable diverter and proppant. When used far field from the wellbore, both the dissolvable diverter and the proppant of the diversion system are of defined particle sizes and the apparent specific gravity of the proppant is greater than or equal to 1.05.

BACKGROUND OF THE DISCLOSURE

Common stimulation techniques used to enhance production of hydrocarbon fluids from subterranean formations including hydraulic fracturing and acidizing. Typically a fracturing treatment fluid is injected into the formation at a pressure sufficiently high to cause the formation to fracture providing with a pathway for hydrocarbons to flow from the reservoir to the wellbore. Proppant materials are then carried into the fracture by the fracturing fluid, where they remain after the treatment is completed. Proppants have a dual role: (1) they hold the fracture open and (2) create a porous and permeable bed that results from granules packing after the fracturing pressure is released and the fracturing fluid is flowed back. The resulting permeable proppant bed enhances the ability of fluids to migrate from the formation to the wellbore through the fracture, making fracture conductivity the most important parameter in determining the degree of success of a hydraulic fracturing treatment.

With some formations, such as shale, the reservoir is drilled horizontally and then completed with multistage fracture treatments. These completion techniques consist of pumping a large number of stages into the horizontal well.

A key contributor to the success of stimulation is increased fracture surface area which allows more exposure to hydrocarbons in the formation, thereby leading to increased hydrocarbon productivity. This increase in the fracture surface area can be achieved by maximizing the created complex hydraulic fracturing network with far-field diversion. In addition, near-wellbore diversion is an important technique for ensuring uniform distribution of the treatment fluid across a full stage length.

During the life of the well one or more additional fracture treatments may be used to improve the well productivity from zones that were not initially produced. Such additional fracture treatments are known as refracturing treatments or refracs. To properly refracture a well, isolation of certain existing perforations is critical. The isolation is used to restrict or deny the perforations leading to the reservoir sections considered depleted from receiving subsequent fracturing fluids. Operations required to achieve this isolation can range from using a rig to setting physical barriers that redirect the fluid flow (mechanical isolation) to the use of specialized particulates placed in the flow stream to divert the treatment. These specialized particles integrated into the flow stream are commonly called "diverting agents," "diverting materials," or "diverters." Used effectively, diverters can eliminate the need for a rig to provide temporary physical barriers, thus improving the economics of a workover operation.

Diverters are also used to optimize the production of hydrocarbons from low permeability zones within a fracture network by diverting the flow of well treatment fluids (such as fracturing fluids and acidizing fluids) from higher permeability zones to lower permeability zones. When pumped into open hole fractures or through perforated casing, such diverters bridge off and prevent additional fluid flow into higher permeability zones. As a result, well treatment fluids (such as fracturing fluids and acidizing fluids) flow into other areas of lesser conductivity. By increasing the surface area and increasing flow resistance within created channels within the fracture network, hydrocarbon productivity is enhanced.

Many materials have been used as diverting agents. These include water-insoluble and oil-soluble calcium salts of fatty acids, cellophane flakes, naphthalenes, crushed limestone, sodium tetraborate, oyster shells, gilsonite, paraformaldehyde, perlite, oil-soluble resins, rock salt, benzoic acid and most recently phthalic anhydride, polylactic acid (PLA) and polyimides. Such diverters, however, are less effective in the stimulation of horizontal wells which typically require multistage fracture treatments, especially in far field operations. Alternative diverters are therefore desired especially for use in the development of a fracture network far field from the wellbore as well as near the wellbore.

SUMMARY OF THE DISCLOSURE

The disclosure relates to a method of enhancing the production of hydrocarbons within a fracture network by use of a divert system. In a specific embodiment, the disclosure relates to a method of enhancing the production of hydrocarbons in a fracture network far field from the wellbore by use of a divert system. In another specific embodiment, the disclosure relates to a method of enhancing the production of hydrocarbons in a fracture network near the wellbore by use of a divert system.

The disclosure further relates to a method of refracturing a subterranean reservoir by isolating depleted or near depleted perforations within the reservoir by use of a divert system.

In an embodiment, the disclosure relates to a method of stimulating the production of hydrocarbons from a subterranean formation penetrated by a wellbore by flowing into a high permeability zone of a fracture within a subterranean formation near the wellbore a divert system comprising a mixture of a dissolvable diverter and a proppant. At least a portion of the high permeability zone is propped open with the proppant of the mixture. At least a portion of the high permeability zone is blocked with the diverter. A fluid is then pumped into the subterranean formation and into a lower permeability zone of the formation farther from the wellbore. The diverter is dissolved and hydrocarbons are produced from the high permeability zone and the lower permeability zones of the fracture.

In another embodiment of the disclosure, a method of enhancing the productivity of fluid from a well is provided using a fluid containing a divert system of dissolvable diverter particulates and proppant. In this method, a first fluid is pumped into a subterranean formation penetrated by a well at a pressure sufficient to create or enhance a fracture near the wellbore. The first fluid contains the divert system. The diverter is dissolvable at in-situ conditions for producing fluid from the well. The first fluid then flows into a high permeability zone of the fracture. At least a portion of the high permeability zone is propped open with the proppant. At least a portion of the high permeability zone is blocked with the diverter particulates. A second fluid is then pumped into the subterranean formation and into a lower permeability zone of the subterranean formation farther from the wellbore. At least a portion of the diverter particulates blocking at least a portion of the high permeability zone near the wellbore are then dissolved at in-situ reservoir conditions. Fluid is then produced from the high permeability zone and the lower permeability zone.

In another embodiment, a method of stimulating a subterranean formation penetrated by a wellbore with a fluid containing a divert system of diverter particulates and proppant is provided. In this method, a casing within the wellbore is perforated. A channel extending from the casing into the subterranean formation is created. A fluid containing the divert system is then pumped into the wellbore at a pressure sufficient to create or enlarge a fracture near the wellbore. At least a portion of the diverter particulates are dissolvable at in-situ conditions. The fluid containing the divert system is then flowed into a high permeability zone within the fracture near the wellbore. At least a portion of the high permeability zone is blocked with diverter particulates. The sized particle distribution of the diverter particulates is sufficient to at least partially block the penetration of a second fluid into the high permeability zone of the formation. A second fluid is then pumped into the subterranean formation and into a lower permeability zone of the formation farther from the wellbore. Diverter particulates near the wellbore are then dissolved at in-situ reservoir conditions. Fluid is then produced from the high permeability zone containing the proppant of the divert system.

In another embodiment of the disclosure, a method of enhancing the productivity of fluid from the near wellbore region of a well penetrating a subterranean formation is provided. In this embodiment, a first fluid is pumped into a high permeability zone of a fracture near the wellbore. The first fluid contains a divert system having diverter particulates and proppant. At least a portion of the diverter particulates are dissolvable at in-situ reservoir conditions. The first fluid then flows into the high permeability zone of the fracture. At least a portion of the high permeability zone is propped open with the proppant of the divert system. A portion of the high permeability zone is blocked with the diverter particulates. A second fluid containing a diverter is then pumped into the subterranean formation and into a lower permeability zone of the formation farther from the wellbore followed by the pumping of a proppant laden fluid into a zone of lower permeability of the formation. The diverter of the second fluid and the diverter particulates of the divert system may be the same. The proppant of the proppant laden fluid and the proppant of the divert system may be the same. The steps of adding a second fluid having a diverter and then a proppant laden fluid may be repeated. The diverter blocking at least portion of the high permeability zone near the wellbore may then be dissolved. Fluid may then be produced from the high permeability zone and the zone of lower permeability.

In another embodiment, a method of stimulating the production of hydrocarbons from a subterranean formation far field from a wellbore is provided. In this method, a divert system comprising (i) a dissolvable diverter having a particle size from about 4 to about 50 mesh and (ii) a proppant having a particle size range between from 40 to about 325 mesh and an apparent specific gravity from about 1.05 to about 3.7 is flowed into a high permeability zone of a fracture within a subterranean formation far field from the wellbore. At least a portion of the high permeability zone is propped open with the proppant of the divert system and at least a portion of the high permeability zone is blocked with diverter particulates of the divert system. A fluid is then pumped into the subterranean formation and into a lower permeability zone of the fracture. At least a portion of the diverter particulates blocking at least a portion of the high permeability zone are subsequently dissolved. Hydrocarbons may then be produced from the high permeability zone and the low permeability zone of the fracture. A fracture network may be formed originating from the fracture into which the divert system was first introduced.

In another embodiment, a method of enhancing the productivity of hydrocarbons from a well penetrating a subterranean formation is provided using a divert system having (i) dissolvable diverter particulates having a particle size from about 4 to about 50 mesh and an apparent density from about 1.2 to about 1.75 g/cc and (ii) a proppant having a particle size range between from about 40 to about 325 mesh and an apparent specific gravity from about 1.05 to about 3.7. A fluid containing the divert system is pumped into the subterranean formation at a pressure sufficient to create or enhance a fracture far field from the wellbore. The fluid is allowed to flow into a high permeability zone of the fracture, propping at least a portion of the high permeability zone with the proppant of the divert system and blocking at least a portion of the high permeability zone with diverter particulates of the divert system. A subsequent fluid is then pumped into the subterranean formation and into a lower permeability zone of the subterranean formation farther from the wellbore. The diverter particulates blocking at least a portion of the high permeability zone far field from the wellbore at in-situ reservoir conditions then dissolved. Fluid may then be produced from the high permeability zone and the lower permeability zone.

In another embodiment, a method of stimulating a subterranean formation penetrated by a wellbore is provided wherein casing within the wellbore is first perforated to provide a channel extending from the casing into the subterranean formation far field from the wellbore. A fluid is then pumped into the wellbore at a pressure sufficient to create or enlarge a fracture far field from the wellbore in the subterranean formation. The fluid contains a divert system of (i) diverter particulates, dissolvable in-situ at conditions for producing fluid from the well, the diverter particulates having a particle size from about 10 to about 50 mesh and an apparent density between from about 1.4 to about 1.75 g/cc and (ii) proppant having a particle size range between from about 40 to about 325 mesh and an apparent specific gravity greater than or equal to 1.05. The divert system is then allowed to flow into a high permeability zone within the far field fracture. At least a portion of the high permeability zone is blocked with the diverter particulates. The sized particle distribution of the particulates is sufficient to at least partially block the penetration of a second fluid into the high permeability zone of the fracture. The second fluid is pumped into the subterranean formation and into a lower permeability zone of the far field fracture. At least a portion of the diverter particulates are subsequently dissolved at in-situ reservoir conditions. Fluid may then be produced from the high permeability zone and the low permeability zone of the fracture.

In another embodiment, a method of enhancing the productivity of fluid from the far field region of a wellbore penetrating a subterranean formation is provided wherein a first fluid is pumped into a high permeability zone of a fracture far field from the wellbore. The first fluid contains a divert system having (i) diverter particulates dissolvable at in-situ conditions for producing fluid from the well, the diverter particulates having a particle size from about 10 to about 50 mesh an apparent density from about 1.2 to about 1.75 g/cc and (ii) proppant having a particle size range between from about 40 to about 325 mesh and having an apparent specific gravity from about 1.05 to about 3.7. The mixture of the first fluid is allowed to flow into the high permeability zone, propping at least a portion of the high permeability zone with the proppant of the divert system and blocking at least a portion of the high permeability zone with the diverter particulates. A second fluid is then pumped into the far field fracture and into the lower permeability zone. The second fluid may contain proppant and/or diverter. When present, the diverter of the second fluid may be the same as the diverter particulates in the divert system. When present, the proppant of the proppant laden fluid may be the same proppant as in in the divert system. Diverter particulates of the divert system blocking at least portion of the high permeability zone in the far field region of the wellbore may then be dissolved. Fluid may then be produced from the high permeability zone and the zone of lower permeability.

Characteristics and advantages of the present disclosure described above and additional features and benefits will be readily apparent to those skilled in the art upon consideration of the following detailed description of various embodiments and referring to the accompanying drawing.

BRIEF DESCRIPTION OF THE DRAWINGS

The following figures are part of the present specification, included to demonstrate certain aspects of various embodiments of this disclosure and referenced in the detailed description herein:

FIGS. 2A, 2B, 2C and 2D depict a stimulation method using a fluid containing a dissolvable diverter.

FIGS. 4A, 4B, 4C and 4D depict a stimulation method using a mixture of dissolvable diverter and proppant for far field diversion as disclosed herein.

DETAILED DESCRIPTION OF THE PREFERRED EMBODIMENTS

Figure 1:
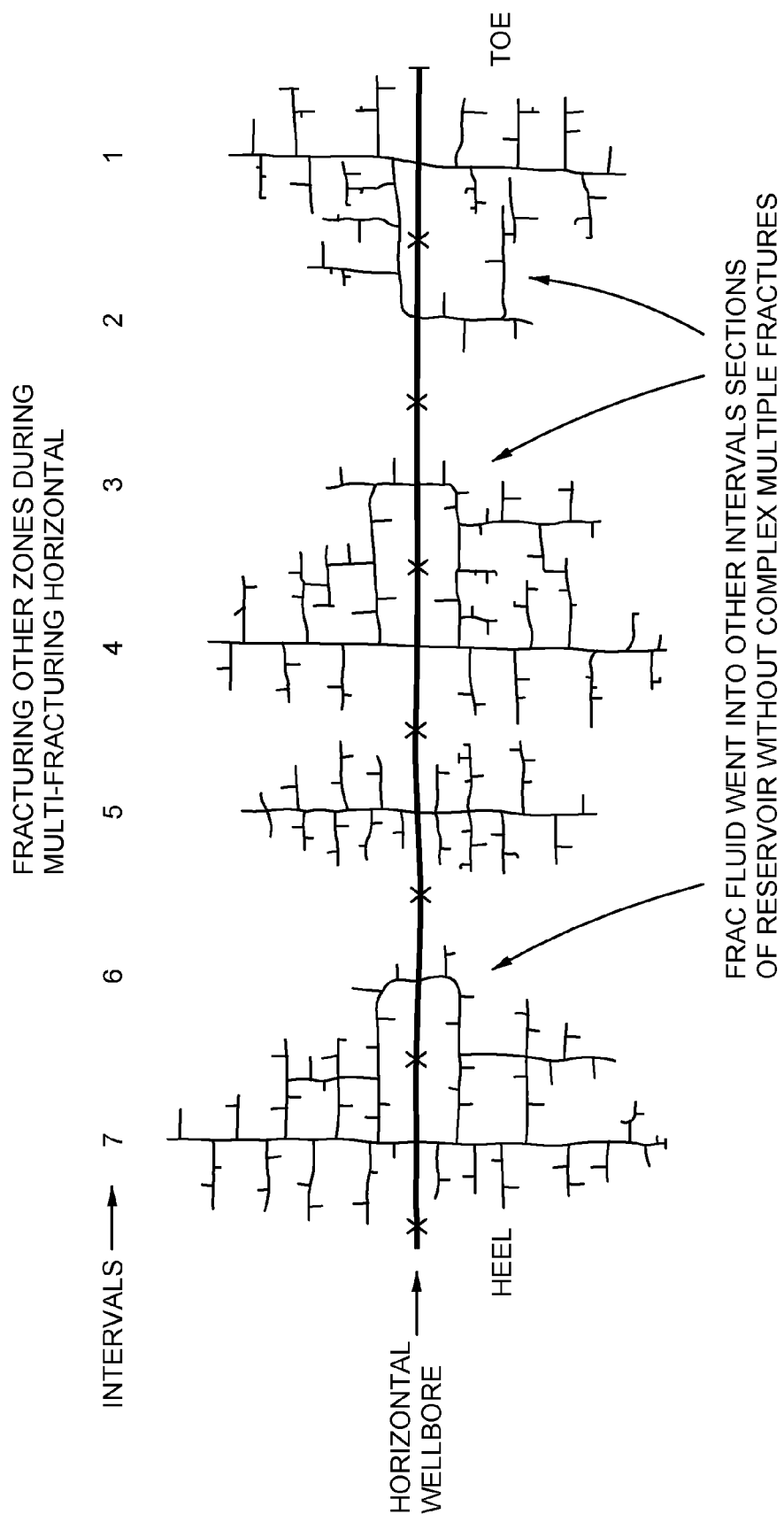
FIG. 1 illustrates the reduction in fracturing areas which are outside of intervals subjected to fracturing by use of the mixture disclosed herein.

Characteristics and advantages of the present disclosure and additional features and benefits will be readily apparent to those skilled in the art upon consideration of the following detailed description of exemplary embodiments of the present disclosure and referring to the accompanying figures. It should be understood that the description herein and appended drawings, being of example embodiments, are not intended to limit the claims of this patent or any patent or patent application claim1ng priority hereto. On the contrary, the intention is to cover all modifications, equivalents and alternatives falling within the spirit and scope of the claims. Many changes may be made to the particular embodiments and details disclosed herein without departing from such spirit and scope.

As used herein and throughout various portions (and headings) of this patent application, the terms "disclosure", "present disclosure" and variations thereof are not intended to mean every possible embodiment encompassed by this disclosure or any particular claim(s). Thus, the subject matter of each such reference should not be considered as necessary for, or part of, every embodiment hereof or of any particular claim(s) merely because of such reference. Also, the terms "including" and "comprising" are used herein and in the appended claims in an open-ended fashion, and thus should be interpreted to mean "including, but not limited to . . . "

Each numerical value set forth herein should be read once as modified by the term "about" (unless already expressly so modified), and then read again as not so modified unless otherwise indicated in context. The term "about" should be understood to include, but not be limited to, any amount or range within 10% of the recited amount or range (for example, a range from about 1 to about 10 encompasses a range from 0.9 to 11). A range listed or described is intended to include support for any conceivable sub-range within the range at least because every point within the range, including the end points, is to be considered as having been stated. For example, "a range of from 1 to 10" is to be read as indicating each possible number along the continuum between about 1 and about 10.

The term "second" as applied to a fluid or a stage shall, unless stated otherwise, refer to a fluid or stage which is successive to a "first" fluid or stage. Fluids or stages may precede the "first" fluid or first stage and fluids and stages may be between a "first" fluid or stage and a "second" fluid or stage. In other words, the terms "first" and "second" only relate to the order of introduction of two fluids.

The term "near wellbore" relates to a distance from a surface of the wellbore. A distance within the near wellbore may be a distance of 0 to about 50 feet from the wellbore surface, or 0 to about 10 feet from the wellbore surface, or 0 to about 5 feet from the wellbore surface.

The term "far field" relates to any portion of the subterranean formation that is not near wellbore, outside of a perforation tunnel or outside of a formation face in open hole configuration. For example, far field may refer to the subterranean zone that is from about 10 feet to about 3000 feet from a wellbore or perforation tunnel, or from about 100 to about 1000 feet from a wellbore or perforation tunnel. A zone within the far field may further be a distance of about 30 feet or more from the wellbore surface, or about 50 feet or more from the wellbore surface, or 50 to 100 feet from the wellbore surface.

In an embodiment, a mixture of a dissolvable diverter and a proppant may be used in a stimulation operation in order to enhance the production of fluids within a subterranean formation. As used herein, the term "subterranean formation" shall include carbonate formations, such as limestone, chalk or dolomite as well as subterranean sandstone or siliceous formations in oil and gas wells, including quartz, clay, shale, silt, chert, zeolite or a combination thereof. The term shall also refer to coal beds having a series of natural fractures, or cleats used in the recovery of natural gases, such as methane, and/or sequestering a fluid which is more strongly adsorbing than methane, such as carbon dioxide and/or hydrogen sulfide.

Typically, the downhole temperature of the wellbore is between from about 80° F. to about 400° F. The dissolvable diverter particulates of the divert system are capable of diverting a well treatment fluid from a high permeability zone to a low permeability zone of a subterranean formation at such bottomhole temperatures. Since conductivity is permeability multiplied by injection geometry, this is synonymous to the statement that the particulates are capable of diverting a well treatment fluid from a highly conductive primary fracture(s) to less conductive secondary fractures. Further, since conductivity is a function of the relative resistance to inflow, the reference to a conductive fracture as used herein is considered synonymous to a conductive reservoir area.

The divert system may be used to increase productivity within the fracture network of horizontal as well as vertical wellbores.

The well treatment fluid used in the methods herein may include fracturing fluids and acidizing fluids.

The divert system may be included in the well treatment fluid. In particular, the divert system may be a component of the fluid, such as a fracturing fluid, acidizing fluid, etc. Alternatively, treatment fluids, such as fracturing fluids and acidizing fluids, which do not contain the divert system may be pumped into the formation before or after the pumping of the divert system.

In an embodiment, the divert system may be pumped into the formation in stages. A stage containing a well treatment fluid but not the divert system may be pumped into the formation after the pumping of any or all of the stages containing the diverter system.

After the casing within the wellbore is secured, the casing may be perforated to provide a channel near the wellbore which extends from the casing into the subterranean formation. The divert system may then be pumped into the channel through the perforated casing. A well treatment fluid containing the divert system may be pumped directly to the high permeability zone of the well formation.

FIG. 2 depicts the use of a fluid in the production of fluids from lower permeability zones of a fracture network of a subterranean formation. The fluid illustrated contains diverter particulates but not proppant. The diverter particulates are shown as being capable of spreading the well treatment fluid deeper into subterranean formations.

In FIG. 2A, diverter particulates are introduced into a fracture of high permeability within a fracture network. The particulates are capable of diverting well treatment fluid to a fracture having lower permeability. Since conductivity is permeability multiplied by injection geometry, this is synonymous to the statement that the particulates are capable of diverting a well treatment fluid from a highly conductive primary fracture(s) to less conductive secondary fractures. Further, since conductivity is a function of the relative resistance to inflow, the reference to a conductive fracture as used herein is considered synonymous to a conductive reservoir area.

Solid particulates typically bridge the flow spaces of fractures on the face of the formation and form a filter cake. For instance, when employed in acid fracturing, the particulates are of sufficient size to bridge the flow space (created from the reaction of the injected acid with the reservoir rock) without penetration of the matrix. By being filtered at the face of the formation, a relatively impermeable or low permeability filter cake is created on the face of the formation. The pressure drop though the filter cake increases the flow resistance and diverts treatment fluid to the less permeable zones of the formation.

When used in stimulation operations, the particle size of the particulates is such that the particulates may form a bridge on the face of the rock. Alternatively, the particle size of the particulates may be such that they are capable of flowing into the fracture and thereby pack the fracture in order to reduce the permeability of at least some of the fractures in the formation.

As illustrated in FIG. 2A, a majority of diverter particulates 10 in a well treatment fluid enter channel 12 and then proceed into one or more fractures 14 [illustrated as two fractures 14a and 14b in FIG. 2A] of high permeability (or non-damaged zone). A temporary block, plug, bridge or viscous pill is shown as forming (at least partially) at fracture 14a and 14b either within the fracture or at the interface of the fracture and channel 12. The terms "block" "plug", "bridge" and "viscous pill" shall be included within the term "bridge" as used herein. Such temporary bridges cause a pressure increase and divert fluid to a lower permeability zone, typically deeper into the subterranean formation, within the fracture network within the formation.

FIG. 2B illustrates the pumping of a second stage of a well treatment fluid containing diverter particulates 20 into channel 12. The fluid is curtailed from entering into fracture 14a and 14b by the presence of diverter particulates 10 and proceeds to lower permeability zones within the fracture network, represented as fractures 24a and 24b. Diverter particulates 20 bridge (at least partially) the flow of fluid in fracture 24a and 24b or the interface of the face of the fracture and channel 12.

A third treatment fluid is then pumped into channel 12, illustrated in FIG. 2C, containing particulates 30 and is diverted into fractures 32a and 32b of lower permeability. The fluid is (at least partially) curtailed from entering into fractures 14a, 14b, 24a and 24b which are already at least partially blocked by diverter particulates 10 and 20, respectively.

Over a period of time, the diverters bridging the fractures dissolve. This in turn causes closure or collapse of the fractures. FIG. 2D illustrates the closing or collapsing of a fracture of high permeability zone (such as fracture 14a) once plugged by diverter particulates 10. The production of fluids from such closed or collapsed fractures is limited by the restricted pathway within the fracture. Such inhibition presents an acute problem with high permeability zones within a fracture network especially those near the wellbore.

FIG. 3 exemplifies the addition of a divert system containing a mixture of dissolvable diverter and proppant in order to promote the production of hydrocarbon fluids. FIG. 3 is illustrative of stimulation operations near the wellbore of the perforating site (entrance into the reservoir) as well as far field stimulation operations.

Figure 3A:
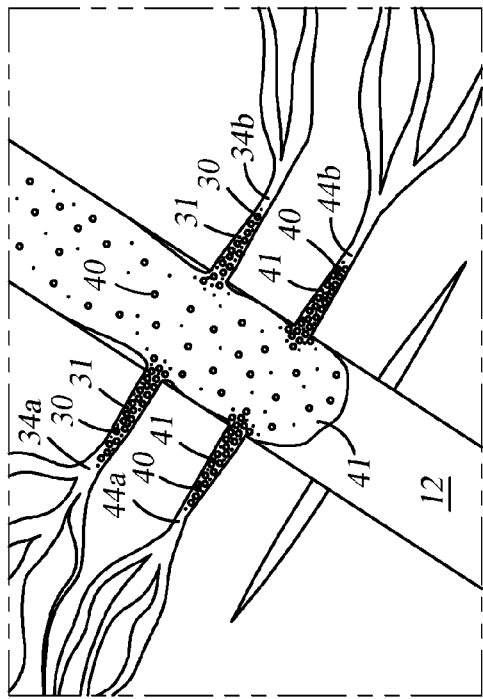
FIGS. 3A, 3B, 3C and 3D depict a stimulation method using a mixture of dissolvable diverter and proppant.

As illustrated in FIG. 3A, a majority of the divert system containing diverter particulates 30 and proppant 31 may enter into the high permeability (or non-damaged zone) represented by fractures 34a and 34b within a fracture network and forming (at least partially) a temporary bridge either within the fracture or at the interface of the fracture face and channel 12. FIG. 3A illustrates particulates 30 forming a bridge at the interface of the channel 12 and within the channel and proppant 31 entering the fracture within the channel and within the fracture.

Figure 3B:
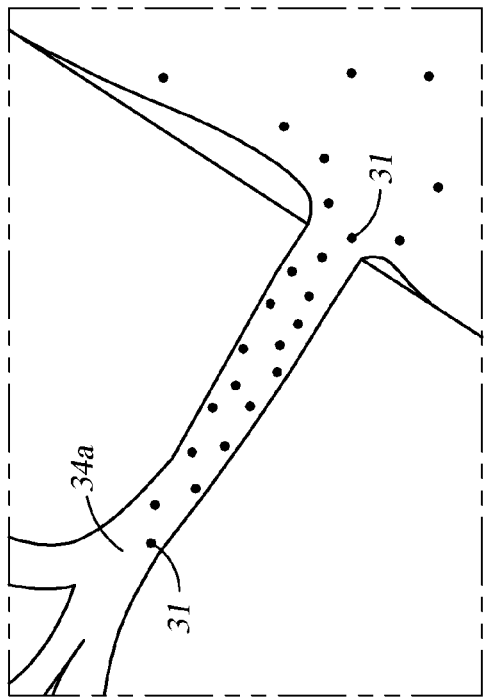

FIG. 3B illustrates the pumping of a second stage of a treatment fluid containing particulates 40. As illustrated in FIG. 3B, the second stage fluid contains proppant 41 though proppant does not necessarily have to be present in the second stage fluid. Proppant 41 may not be the same proppant as proppant 31. The second stage fluid contains dissolvable diverter particulates 40 which may or may not be the same diverter particulates as particulates 30. Diverter particulates 30 curtail the second well treatment fluid from entering (at least substantially) into fracture 34*a* and/or 34*b*. Diverter particulates 40 of the second fluid are shown as forming a bridge or plug (at least partially) within fractures 44*a* and 44*b* and at the face of fractures 44*a* and 44*b* with channel 12. This allows the well treatment fluid to flow further from the perforating site into fracture 44*a* and 44*b* of low permeability.

Figure 3C:
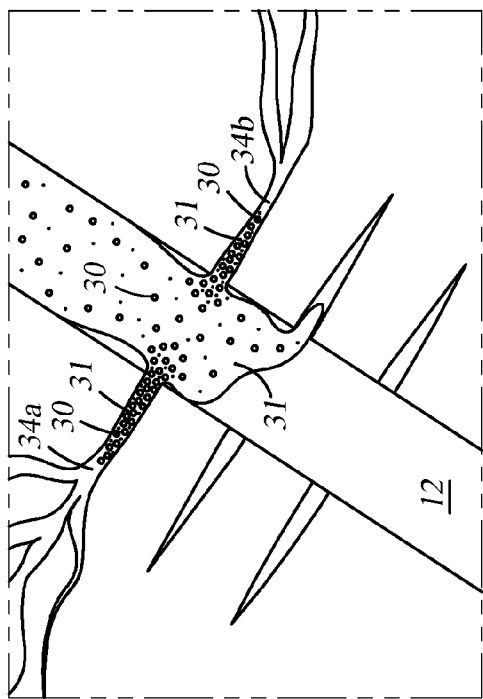
Figure 3D:
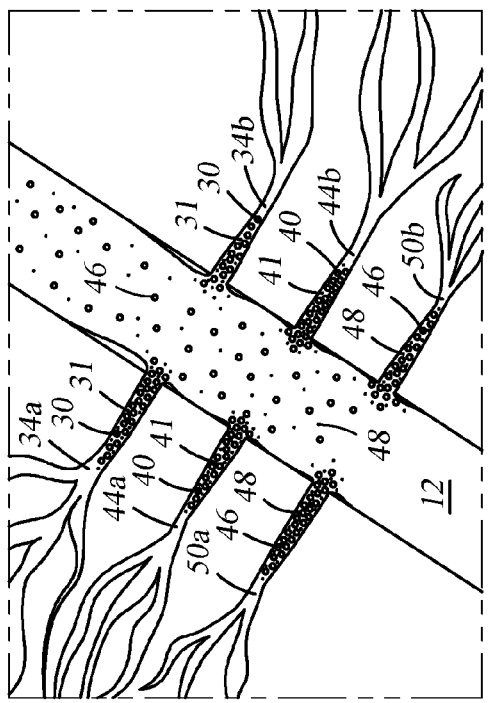

FIG. 3C illustrates the pumping of a third stage of treatment fluid containing diverter particulates 46 and, optionally, proppant 48. The third stage fluid is (at least partially) curtailed from entering into fractures 34*a*, 34*b*, 44*a* and 44*b* which are already at least partially bridged or plugged with diverter particulates 30 and 40. Thus, the third stage treatment fluid containing diverter particulates 46 and optional proppant 48 flow further away from the near wellbore region through channel 12 and into fractures of lower permeability, represented as 50*a* and 50*b*. The process described may be repeated as desired.

At least one secondary fracture having a directional orientation distinct from the directional orientation of the primary fracture may be created. The second fluid diverts the flow of the second fluid into the secondary fracture. This process may be repeated and multiple fluids containing the mixture defined herein may be pumped into the formation to divert the flow of a preceding fluid and to provide proppant to created fractures. In this manner, a complex fracture network may be created consisting of multiple fractures in the formation originating from the primary fracture.

Over a period of time, the diverters which bridge or plug the fractures dissolve. Those fractures diverted by a fluid containing both diverter particulates and proppant, as illustrated as 34*a* in FIG. 3D, remain open due to the presence of the proppant (shown as proppant 31) in the mixture; the proppant not being dissolvable at at-situ reservoir conditions. The production of fluids from such fractures is thereby enhanced. The use of the mixture is particularly of use in those high permeability zones near the wellbore which, as shown in FIG. 2D, typically collapse when the diverter dissolves.

The bridging or plugging (at least partially) of higher permeability zones within a fracture network provides a depth of invasion which is related to the pore throat diameter. For a given formation type, the invasion depth is directly proportional to the nominal pore throat diameter of the formation. Since varying depths of invasion occur throughout the formation based upon the varying permeability or damage throughout the treated zone, the ability of the treatment fluid to invade into pore throats is dependent on the difference between pore throat sizing of the damaged and non-damaged formation. Invasion depths will normally be greater in the cleaner or non-damaged portion of the formation (larger pore throats) than in the lower permeability or damaged zones (smaller or partially filled pore throats). With a greater depth of invasion in the cleaner sections of the formation, more of the treatment fluid may be placed in these intervals.

As such, the use of the divert system increases the complexity of a fracture network by creating additional branch fractures. The proppant of the divert system overcomes the stresses which normally close the natural fractures. The solid diverter particles temporarily bridge inside the fracture to create the low-permeability zone that increases the net pressure within the fracture. As a result, a subsequently introduced fluid stage is redirected to an interval which has not been previously stimulated. The inclusion of the proppant in the mixture prevents or inhibits closing of created fractures after dissolution of the diverter.

In a preferred embodiment, a fluid containing the divert system may be injected into a fracture far field from the wellbore. Such fractures may have been created or enlarged from a hydraulic fracturing operation or may be natural fractures within the formation.

FIG. 4 exemplifies the use of the divert system in a far-field diversion operation to enhance the fracture network and/or complexity. Referring to FIG. 4A, a fracturing fluid containing proppant is illustrated as being pumped into the formation via 1401 to create far field fracture 1402 and secondary fractures 1403 of minimal complexity. Thereafter, shown in FIG. 4B, the divert system is pumped via 1411 into far field fracture 1402 and flows into the zone of high permeability within the fracture. The proppant in the divert system props open at least a portion of the high permeability zone. At least a portion of the high permeability zone is blocked with the diverter particulates of the divert system. As illustrated in FIG. 4B, diverter particulates form bridges 1412 within the stimulated area which promotes the formation of secondary fractures off of the far field fracture. The secondary fractures are illustrated as having a directional orientation distinct from the directional orientation of the far field (primary) fracture.

Bridges 1412 formed from the diverter particulates of the divert system function to divert the flow of subsequently introduced fluid away from the far field (primary) fracture and into secondary fractures. As shown in FIG. 4C, subsequent fracturing fluid is redirected via 1421 toward the smaller fractures (shown as 1422(*a*), (*b*) and (*c*)) or less permeable zones, thereby creating a more complex fracture network. The proppant ensures that fractures temporarily bridged by the diverter particulates remain propped for hydrocarbon flow after the soluble diverter particulates have been dissolved.

Such subsequent fracturing fluid may be a second stage of a fluid containing the divert system. Alternatively, such subsequent fracturing fluids may contain diverter particulates and/or proppant. Where the subsequent fracturing fluid contains diverter particulates and/or proppant, the diverter particulates and/or proppant may or may not be the same as those of the far field divert system illustrated in FIG. 4B.

Thus, the process may be repeated by the pumping of multiple stages which may contain the divert system defined herein to divert the flow of a subsequently introduced fluid and to provide proppant to created fractures. In this manner, a complex fracture network may be created far field from the wellbore, the fracture network consisting of multiple fractures in the formation originating from the primary fracture.

Over time and downhole conditions (such as temperature and pressure) the soluble portion of the particulates of the divert system blocking the high permeability zone of the far field fracture is at least partially dissolved in water, leaving enhanced fracture geometry (shown in FIG. 4D) that is propped open by the insoluble proppant. Hydrocarbons are thereby produced from the high permeability zone and the lower permeability zone of the far field fracture.

The divert system defined herein may further be used to further limit the fracturing of zones in formations (such as shale formations) which are known to exhibit non-uniform interval coverage. Microseismic mapping and well temperature logging often show poor frac fluid distribution across each interval and refracturing of nearby intervals. By directing the placement of fluid containing particulates of the mixture within the fractured zones, out of intervals fracturing areas are reduced. This is shown in FIG. 1 where the intervals are depicted as 7, 6, 5, 4, 3, 2 and 1 (from heel to toe).

Refracturing of a formation using the divert system disclosed herein is especially useful in the refracturing of horizontal wells. The divert system may be used in both near wellbore as well as far field from the wellbore. In such cases, a portion of the wellbore or the entire lateral of the wellbore may be perforated in a multitude of locations, sometimes dozens of locations, from the original fracture stimulation. Further, the wellbore may have new perforated clusters added during the refracturing operation that are intended to be fracture treated for the first time. With all of such perforations open, the divert system may be pumped into the formation. The particulates plug off the zones that are readily accepting the fluid most rapidly such that the fluid moves toward the areas of the formation which are more difficult to treat.

The dissolvable particulates may be of any shape. For instance, the particulates may be substantially spherical, such as being beaded, or pelleted. Further, the particulates may be non-beaded and non-spherical such as an elongated, tapered, egg, tear-drop or oval shape or mixtures thereof. For instance, the particulates may have a shape that is cubic, bar-shaped (as in a hexahedron with a length greater than its width, and a width greater than its thickness), cylindrical, multi-faceted, irregular, or mixtures thereof. In addition, the particulates may have a surface that is substantially roughened or irregular in nature or a surface that is substantially smooth in nature.

The particulates may be partially, but not fully, dissolved at in-situ reservoir conditions. Typically, the particulates are fully dissolved over time at bottomhole temperatures.

Suitable dissolvable diverters for use as the diverter particulates in the divert system include phthalic anhydride, terephthalic anhydride, phthalic acid, terephthalic acid, gilsonite, rock salt, benzoic acid flakes, polylactic acid and mixtures thereof.

Preferred diverting agents include those of structural formula (III):

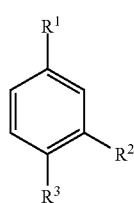

(III)

wherein:
$R^1$ is —COO—$(R^5O)_y$—$R^4$ or —H;
$R^2$ and $R^3$ are selected from the group consisting of —H and —COO—$(R^5O)_y$—$R^4$;
provided both $R^2$ or $R^3$ are —COO—$(R^5O)_y$—$R^4$ when $R^1$ is —H and further provided only one of $R^2$ or $R^3$ is —COO—$(R^5O)_y$—$R^4$ when $R^1$ is —COO—$(R^5O)_y$—$R^4$;
$R^4$ is —H or a $C_1$-$C_6$ alkyl group;
$R^5$ is a $C_1$-$C_6$ alkylene group; and
each y is 0 to 5.

Alternatively, the particulates may be an anhydride of the compound of structural formula (III).

In a preferred embodiment, $R^2$ of the compound of formula (III) is —H and $R^3$ is —COO—$(R^5O)_y$—$R^4$. In an especially preferred embodiment, the compound of formula (III) is phthalic acid (wherein y is 0 and $R^1$ and $R^4$ are —H). In another preferred embodiment, the compound of formula (III) is phthalic acid anhydride.

Still in another preferred embodiment, $R^2$ of the compound of formula (III) is —COO—$(R^5O)_y$—$R^4$ and $R^3$ is —H. In an especially preferred embodiment, the compound of formula (III) is terephthalic acid (wherein y is 0 and $R^2$ and $R^4$ are —H). In another preferred embodiment, the compound of formula (III) is terephthalic acid anhydride.

Diverting agents of formula (III) are preferred where the bottomhole temperature of the well is less than 250° F., such as between 80° F. and 250° F. In such instances, phthalic anhydride, terephthalic anhydride, phthalic acid and terephthalic acid are especially preferred.

Other diverters include those aliphatic polyesters having the general formula of repeating units illustrated in structural formula (I) below:

(I)

where n is an integer between 75 and 10,000 and R is selected from the group consisting of hydrogen, alkyl (preferably a $C_1$-$C_6$ alkyl), aryl (preferably a $C_6$-$C_{18}$ aryl), alkylaryl (preferably having from about 7 to about 24 carbon atoms), acetyl, heteroatoms (such as oxygen and sulfur) and mixtures thereof. In a preferred embodiment, the weight average molecular weight of the aliphatic polyester is between from about 100,000 to about 200,000.

A preferred aliphatic polyester is poly(lactide). Poly(lactide) is synthesized either from lactic acid by a condensation reaction or more commonly by ring-opening polymerization of cyclic lactide monomer. Since both lactic acid and lactide can achieve the same repeating unit, the general term poly(lactic acid) as used herein refers to formula (I) without any limitation as to how the polymer was made such as from lactides, lactic acid, or oligomers, and without reference to the degree of polymerization.

The lactide monomer exists generally in three different forms: two stereoisomers L- and D-lactide and racemic D,L-lactide (meso-lactide). The oligomers of lactic acid, and oligomers of lactide may be defined by the formula:

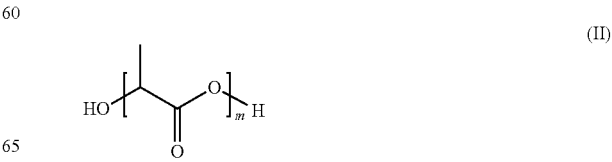

(II)

where m is an integer: 2≤m≤75. Preferably m is an integer: 2≤m≤10. These limits correspond to number average molecular weights below about 5,400 and below about 720, respectively. The chirality of the lactide units provides a means to adjust, inter alia, degradation rates, as well as physical and mechanical properties. Poly(L-lactide), for instance, is a semi-crystalline polymer with a relatively slow hydrolysis rate. Poly(D,L-lactide) may be a more amorphous polymer with a resultant faster hydrolysis rate. The stereoisomers of lactic acid may be used individually or combined. Additionally, they may be copolymerized with, for example, glycolide or other monomers like ϵ-caprolactone, 1,5-dioxepan-2-one, trimethylene carbonate, or other suitable monomers to obtain polymers with different properties or degradation times. Additionally, the lactic acid stereoisomers may be modified by blending high and low molecular weight polylactide or by blending polylactide with other polyesters.

Where the bottomhole temperature of the well is greater than 250° F., such as between 225° F. and 400° F., the preferred diverter particulates include those of formula (II), such as polylactic acid.

Further, a mixture of the diverter particulates of formula (III) and the polyesters of formula (II) may be used. In such cases, the weight ratio of particulates of formula (I) and particulates of formula (III) introduced into the well is typically between from about 95:5 to about 5:95 and more typically between from about 40:60 to about 60:40. The mixture of particulates are particularly effective when placed into wells having bottom hole temperatures between from about 140° F. to about 190° F. For instance, the compound of formula (III) enhances the performance of the aliphatic polyester of formula (I) since in the absence of the compound of formula (III) the aliphatic polyester is non-dissolvable or sparingly soluble at bottomhole temperatures less than 250° F.

Further, the phthalic acid or phthalic acid anhydride of formula (III) may be used to enhance the activity of other aliphatic polyesters including star- and hyper-branched aliphatic polyesters polymers as well as other homopolymers, random, block and graft copolymers. Such suitable polymers may be prepared by polycondensation reactions, ring-opening polymerizations, free radical polymerizations, anionic polymerizations, carbocationic polymerizations, and coordinative ring-opening polymerization for, e.g., lactones, and any other suitable process. Specific examples of suitable polymers include polysaccharides such as dextran or cellulose; chitin; chitosan; proteins; orthoesters; poly(glycolide); poly(ϵ-caprolactone); poly(hydroxybutyrate); poly(anhydrides); aliphatic polycarbonates; poly(orthoesters); poly(amino acids); poly(ethylene oxide); and polyphosphazenes.

Typically, the amount of diverter particulates (in the divert system) in the fluid introduced into the well is between from about 0.01 to about 30 weight percent (based on the total weight of the fluid), more typically from about 0.01 to about 3% by weight.

The particulates defining the mixture or use in the method disclosed herein have a sized particle distribution effective to block the penetration of the fluid into the high permeability zone of the formation. Typically, the particle size distribution of the particulates is in the range from about 0.1 micron to about 1.0 millimeter for near wellbore diversion operations. In near wellbore applications, the filter cake is more easily formed when at least 60%, more preferably 80%, of the particulates of the divert system have a particle size between from about 150 μm to about 2000 μm.

With far field diversion, the particle size of the diverter particulates of the divert system is typically from about 4 to 50 about mesh. Further, the apparent density of the diverter particulates of the divert system, when used for far field diversion, is preferably greater than or equal to 1.2 g/cc, preferably from about 1.2 to about 1.75 g/cc.

The divert system is typically introduced as a slurry in a carrier fluid. Suitable carrier fluids include water, salt brine or slickwater. Suitable brines including those containing potassium chloride, sodium chloride, cesium chloride, ammonium chloride, calcium chloride, magnesium chloride, sodium bromide, potassium bromide, cesium bromide, calcium bromide, zinc bromide, sodium formate, potassium formate, cesium formate, sodium acetate, and mixtures thereof.

When used in far field diversion, the carrier fluid is more desirably viscous than slickwater, preferably having a viscosity in excess of 5 cP, and most preferably having a viscosity in excess of 10 cP at room temperature (measuring using a Brookfield Viscometer equipped with a #2 spindle stirring at 10 rpm).

The fluid containing the divert system may be gelled or non-gelled. Typically the fluid is gelled by the inclusion of a viscosifying agent such as a viscosifying polymer or viscoelastic fluid. The fluid may contain a crosslinking agent though a crosslinking agent is not required.

The fluid of the treatment fluid may further be foamed with a liquid hydrocarbon or a gas or liquefied gas such as nitrogen or carbon dioxide. In addition, the fluid may further be foamed by inclusion of a non-gaseous foaming agent. The non-gaseous foaming agent may be amphoteric, cationic or anionic. Suitable amphoteric foaming agents include alkyl betaines, alkyl sultaines and alkyl carboxylates, such as those disclosed in U.S. Patent Publication No. 2010/0204069, herein incorporated by reference. Suitable anionic foaming agents include alkyl ether sulfates, ethoxylated ether sulfates, phosphate esters, alkyl ether phosphates, ethoxylated alcohol phosphate esters, alkyl sulfates and alpha olefin sulfonates. Suitable cationic foaming agents include alkyl quaternary ammonium salts, alkyl benzyl quaternary ammonium salts and alkyl amido amine quaternary ammonium salts.

The pH of the treatment fluid containing the divert system and proppant may further be adjusted when desired. When adjusted, the fluid typically has a value of about 6.5 or more, 7 or more, 8 or more, 9 or more, between 9 and 14, and, most preferably, between 7.5 and 9.5. The pH may be adjusted by any means known in the art, including adding acid or base to the fluid, or bubbling carbon dioxide through the fluid.

The amount of proppant in the divert system is typically between from about 0.01 to about 3% by weight based on the total weight of the fluid pumped into the well containing the divert system.

For use in near wellbore applications, the proppant of the divert system may be any proppant suitable for stimulation known in the art and may be deformable or non-deformable at in-situ reservoir conditions. Examples include, but are not limited to, conventional high-density proppants such as quartz, glass, aluminum pellets, silica (sand) (such as Ottawa, Brady or Colorado Sands), synthetic organic particles such as nylon pellets, ceramics (including aluminosilicates), sintered bauxite, and mixtures thereof.

In addition, protective and/or hardening coatings, such as resins to modify or customize the density of a selected base proppant, e.g., resin-coated sand, resin-coated ceramic particles and resin-coated sintered bauxite may be employed. Examples include Suitable proppants further include those set forth in U.S. Patent Publication No. 2007/0209795 and U.S. Patent Publication No. 2007/0209794, herein incorporated by reference.

Further, any of the ultra-lightweight (ULW) proppants may also be used. Such proppants are defined as having a density less than or equal to 2.45 g/cc, typically less than or equal to 2.25, more typically less than or equal to 2.0, even more typically less than or equal to 1.75. Some ULW proppants have a density less than or equal to 1.25 g/cc. Exemplary of such relatively lightweight proppants are ground or crushed walnut shell material that is coated with a resin, porous ceramics, nylon, etc.

In a preferred embodiment, the proppant is a relatively lightweight or substantially neutrally buoyant particulate material or a mixture thereof. Such proppants may be chipped, ground, crushed, or otherwise processed. By "relatively lightweight" it is meant that the proppant has an apparent specific gravity (ASG) at room temperature that is substantially less than a conventional proppant employed in hydraulic fracturing operations, e.g., sand or having an ASG similar to these materials. Especially preferred are those proppants having an ASG less than or equal to 3.25. Even more preferred are ultra-lightweight proppants having an ASG less than or equal to 2.25, more preferably less than or equal to 2.0, even more preferably less than or equal to 1.75, most preferably less than or equal to 1.25 and often less than or equal to 1.05.

By "substantially neutrally buoyant", it is meant that the proppant has an ASG close to the ASG of an ungelled or weakly gelled carrier fluid (e.g., ungelled or weakly gelled completion brine, other aqueous-based fluid, or other suitable fluid) to allow pumping and satisfactory placement of the proppant using the selected carrier fluid. For example, urethane resin-coated ground walnut hulls having an ASG of from about 1.25 to about 1.35 may be employed as a substantially neutrally buoyant proppant particulate in completion brine having an ASG of about 1.2. As used herein, a "weakly gelled" carrier fluid is a carrier fluid having minimum sufficient polymer, viscosifier or friction reducer to achieve friction reduction when pumped down hole (e.g., when pumped down tubing, work string, casing, coiled tubing, drill pipe, etc.), and/or may be characterized as having a polymer or viscosifier concentration of from greater than about 0 pounds of polymer per thousand gallons of base fluid to about 10 pounds of polymer per thousand gallons of base fluid, and/or as having a viscosity of from about 1 to about 10 centipoises. An ungelled carrier fluid may be characterized as containing about 0 pounds per thousand gallons of polymer per thousand gallons of base fluid. (If the ungelled carrier fluid is slickwater with a friction reducer, which is typically a polyacrylamide, there is technically 1 to as much as 8 pounds per thousand of polymer, but such minute concentrations of polyacrylamide do not impart sufficient viscosity (typically <3 cP) to be of benefit).

Other suitable relatively lightweight proppants are those particulates disclosed in U.S. Pat. Nos. 6,364,018, 6,330,916 and 6,059,034, all of which are herein incorporated by reference. These may be exemplified by ground or crushed shells of nuts (pecan, almond, ivory nut, brazil nut, macadamia nut, etc.); ground or crushed seed shells (including fruit pits) of seeds of fruits such as plum, peach, cherry, apricot, etc.; ground or crushed seed shells of other plants such as maize (e.g. corn cobs or corn kernels), etc.; processed wood materials such as those derived from woods such as oak, hickory, walnut, poplar, mahogany, etc. including such woods that have been processed by grinding, chipping, or other form of particalization. Preferred are ground or crushed walnut shell materials coated with a resin to substantially protect and water proof the shell. Such materials may have an ASG of from about 1.25 to about 1.35.

Further, the relatively lightweight particulate for use in the invention may be a selectively configured porous particulate, as set forth, illustrated and defined in U.S. Pat. No. 7,426,961, herein incorporated by reference.

When the divert system is to be used in far field applications, greater specificity in the selection for the proppant of the divert system (as well as the diverter particulates) is often desirable. Typically, the weight ratio of diverter particulates to proppant in the divert system for use in far field diversion is from about 5:95 to about 95:5.

For far field diversion treatments, the proppant of the divert system is preferably one that has an ASG greater than or equal to 1.05 and preferably greater than or equal to 1.9 and most preferably greater or equal to 2.6. When used with far field diversion, the particle size of the proppant is desirably between from about 40 to about 325 mesh.

Preferred proppants for the divert system for use in far field diversion are sand and relatively light weight or substantially neutrally buoyant particulate materials or mixtures thereof.

While the divert system may be pumped into the formation far field as a component of a well treatment fluid, such as a fracturing fluid or acidizing fluid, in another embodiment, a well treatment fluid may be pumped into the formation prior to pumping of the divert system. Further, a well treatment fluid not containing the divert system may be pumped into the formation after the particulates of the divert system have blocked or plugged (at least partially) the face of one zone within the fracture network.

Further, a fluid containing the divert system may be pumped into the formation in stages. A stage containing a well treatment fluid but not the divert system may be pumped into the formation after any or all of the stages containing the diverter system.

A fluid containing the diverter system may further be pumped into the wellbore in alternative stages and may be separate by spacer fluids. The spacer fluid typically contains a salt solution such as NaCl, KCl and/or NH$_4$Cl. For instance, when used in an acid stimulation operation, it may be desirable to alternate the pumping of acid stimulation fluids and the fluid containing the diverter system. An exemplary pumping schedule may be (i) pumping an acid stimulation fluid; (ii) optionally pumping a spacer fluid; (iii) pumping a fluid containing the diverter system; (iv) optionally pumping a spacer fluid; and then repeating the cycle of steps (i), (ii), (iii) and (iv).

A fluid containing the divert system may further contain additional well treatment fluid additives. These include one or more conventional additives to the well service industry such as a gelling agent, fluid loss additives, gel breaker, surfactant, demulsifier, biocide, mutual solvent, surface tension reducing agent, defoaming agent, demulsifier, non-emulsifier, scale inhibitor, gas hydrate inhibitor, enzyme breaker, oxidative breaker, buffer, clay stabilizer, acid, buffer, solvent or a mixture thereof.

Where the fluid containing the mixture is an acidizing fluid, it may be preferable to include within the fluid a corrosion inhibitor, a corrosion inhibitor intensifier, or a combination thereof. The purpose of these additives is to reduce the corrosive effects that the acids may have on the well tubulars. Suitable corrosion inhibitors can include alkali metal nitrites, nitrates, phosphates, silicates and benzoates. Representative suitable organic inhibitors include hydrocarbyl amine and hydroxy-substituted hydrocarbyl amine neutralized acid compound, such as neutralized phosphates and hydrocarbyl phosphate esters, neutralized fatty acids (e.g., those having 8 to about 22 carbon atoms), neutralized carboxylic acids (e.g., 4-(t-butyl)-benzoic acid and formic acid), neutralized naphthenic acids and neutralized hydrocarbyl sulfonates. Mixed salt esters of alkylated succinimides are also useful. Corrosion inhibitors can also include the alkanolamines such as ethanolamine, diethanolamine, triethanolamine and the corresponding propanolamines as well as morpholine, ethylenediamine, N,N-diethylethanolamine, alpha- and gamma-picoline, piperazine and isopropylaminoethanol.

Fluids containing the mixture may also have an internal breaker built into the system to insure that the fluid viscosity can be reduced after a period of time. The internal breaker may also be an oxidizer such as, but not limited to, persulfates, such as ammonia persulfate and sodium persulfate, and peroxidizers such as hydrogen peroxide.

All percentages set forth in the Examples are given in terms of weight units except as may otherwise be indicated.

EXAMPLES

The following designations are used in Examples 1-7:

A: a 90:10 v/v mixture of phthalic anhydride:phthalic acid, 20/40 mesh, melting range[1]: 266-270° F.;

[1] Melting range represents the temperature at which the solid started to soften to when it was completely melted.

B: a 85:15 v/v mixture of phthalic anhydride:phthalic acid, 8/50 mesh, melting range: 266-356° F.;

C: polylactic acid, 14/70 mesh, melting range: 298-329° F.;

D: polylactic acid, 10/70 mesh, melting range: 336-345° F.

E: phthalic anhydride of 10/50 mesh and specific gravity of 1.5 g/cc with melting range: 266-270° F.

F: polylactic acid of 10/50 mesh and specific gravity of 1.5 g/cc with melting range: 298-329° F.

Example 1

Phthalic anhydride (obtained from a commercial supplier) and Sample A (8 g of each) were first mixed with 100 mL deionized water or HCl 15% and maintained for 20 hours at 180° F., and then cooled down to room temperature and kept for 3 hours. The mixture was vacuum filtrated with 100 mL water and dried for 24 hours at 160° F. The results are set forth in Table I.

TABLE I

| Sample | Dissolved (%) | Melting Range[2], ° F. | Solvent |
|---|---|---|---|
| Commercial Phthalic Anhydride | 6 | 403 | Deionized water |
| Sample A | 7.5 | 401 | Deionized water |
| Sample A, crushed | 4 | 397-399 | Deionized water |
| Commercial Phthalic Anhydride | 4 | 412 | HCl 15% |
| Sample A | 0 | 410 | HCl 15% |
| Sample A, crushed | 16 | 415 | HCl 15% |

[1] Melting range represents the temperature at which the solid started to soften to when it was completely melted.
[2] Undissolved sample, not starting material.

FTIR and melting point of the recovered undissolved samples showed that the remaining phthalic anhydride had converted into phthalic acid.

Example 2

Samples of Sample A (each 5 g) were mixed with 100 mL of either deionized water (DI) or tap water for (1) 54 hours at 180° F. and (2) 64 hours at 140° F. and then left to cool at room temperature. The solids were vacuum filtrated with 100 mL water and dried for 24 h at 160° F. The results are set forth in Table II.

TABLE II

| 64 hr PERCENT SOLUBILITY @ 140° F. | | 54 hr PERCENT SOLUBILITY @ 180° F. | |
|---|---|---|---|
| tap water | DI | tap water | DI |
| 18.5 | 13.4 | 5.6 | 9.3 |

The FTIR and melting point of the recovered undissolved samples showed that the remaining phthalic anhydride had converted into phthalic acid. Table II illustrates that more phthalic anhydride was converted to phthalic acid at higher temperatures. Sample A was thus more suitable for lower temperature applications.

Example 3

Different initial weights of Sample A were mixed with 18 mL of deionized water for 24 hours at 250° F. using a digestion vessel. After the samples cooled down, they were vacuum filtrated with deionized water and dried for 24 hours at 160° F. The results are set forth in Table III. The FTIR and melting point of the recovered undissolved samples showed that the remaining phthalic anhydride had converted into phthalic acid.

TABLE III

| Sample # | Sample A weight (g) | Dissolution amount (wt. %) |
|---|---|---|
| 1 | 1 | 55.6 |
| 2 | 0.5 | 83.7 |
| 3 | 0.25 | 100 |
| 4 | 0.1 | 100 |
| 5 | 0.05 | 100 |
| 6 | 0.025 | 100 |

Example 4

Different initial weights of Sample C were tested for solubility by using a digestion vessel (at 250° F. for 24 hours) and mixing with 18 mL of DI water, using different sample concentrations. The results are set forth in Table IV.

TABLE IV

| Sample # | Sample C weight (g) | Dissolution amount (wt. %) |
|---|---|---|
| 1 | 1.000 | 100 |
| 2 | 0.500 | 100 |
| 3 | 0.250 | 100 |
| 4 | 0.100 | 100 |
| 5 | 0.050 | 100 |
| 6 | 0.025 | 100 |

Example 5

Samples were dissolved in water and heated in a water bath. After reaching room temperature, the samples were filtered via a vacuum. The recovered material was then dried overnight and the percentage of dissolved solids was calculated based on the amount of sample retained on a Whatman #41 filter paper. All samples were allowed to dry for at least 24 hours at approximately 160° F. The samples (2.5 total) were then tested for solubility in 50 mL of deionized water using different temperatures (heating for 24 or 48 hours). The 1:1 mixture of Sample B and Sample C were made by mixing equal amounts of each product (1.25 g) and diluting in 50 mL total deionized water. The results are set forth in Table V:

TABLE V

| SAMPLE | 24 hr | | 48 hr | | |
|---|---|---|---|---|---|
|  | 140° F. | 180° F. | 80° F. | 180° F. | 300° F. |
| B | 8.7 | 21.6 | 19.9 | 5.4 | 11.0 |
| B | 6.1 | n/a | 24.1 | n/a | 10.5 |
| C | 0.31 | 1.1 | 0.99 | 9.9 | 99.3 |
| C | 0.30 | n/a | 0.98 | n/a | 99.2 |
| B:C | 10.9 | 31.1 | 13.8 | 30.1 | 90.5 |
| B:C | 10.2 | n/a | 12.9 | n/a | 87.2 |

Example 6

Additional solubility tests were performed using Sample B and Sample D (2.5 g total) in 50 mL of deionized water using different temperatures (heating for 24 or 48 hr). The 1:1 mixture of Sample B:Sample D was made by mixing equal amounts of each product (1.25 g) and diluting in 50 mL deionized water. The results are set forth in Table VI:

TABLE VI

| SAMPLE | 24 hr | | 48 hr |
|---|---|---|---|
|  | 150° F. | 180° F. | 150° F. |
| B | 24.8 | 21.6 | 16.5 |
| D | 0.2 | 0.24 | 0.1 |
| 1:1 B:D | 20.2 | 23.1 | 16.7 |

The Examples illustrate that phthalic anhydride/phthalic acid is more suitable as a diverting agent in lower temperatures (180-250° F.) applications and polylactic acid is more suitable as a diverting agent at higher temperature higher temperature (>250° F.) applications. The Examples further illustrate, based on the solubility results, that phthalic anhydride/phthalic acid acts enhances lowering the temperature at which polylactic acid dissolves. When mixed with polylactic acid, the Examples illustrate that phthalic anhydride/phthalic acid acts to enhance the activity of polylactic acid, while lowering the temperature at which polylactic dissolves. Thus, when mixed with phthalic anhydride/phthalic acid, polylactic acid may be used in lower temperature applications.

Example 7

Conductivity tests of a mixture of 13.52 g (85 wt. %) phthalic acid anhydride and 2.38 g (15 wt. %) LiteProp™ 125 lightweight proppant, a product of Baker Hughes Incorporated, having an apparent specific gravity of 1.25 at room temperature, were conducted. The tests were performed according to a modified API RP 61 (1$^{st}$ Revision, Oct. 1, 1989) using an API 10 conductivity cell with Ohio sandstone wafer side inserts to simulate the producing formation. The mixture was then loaded between the sealed sandstone wafers to increase the propped width. The mixture was loaded in the conductivity cell at about 0.5 lb/ft². The conductivity cell was then placed on a press and was subjected to a closure stress of 5,000 psi and a temperature of 200° F. De-ionized water was then allowed to flow through the test pack at 10 ml/min and the baseline conductivity determined. The cell was then shut off for 24 hours at which the flow of de-ionized water was resumed and Darcy flow maintained. The results are set forth in Table VII.

TABLE VII

| TIME, Hours | STRESS, Psi | CONDUCTIVITY, md-ft | PERMEABILITY, Darcies | WIDTH, mm |
|---|---|---|---|---|
| 0 | 5000 | 559 | 118 | 1.44 |
| 24 | 5000 | 2176 | 474 | 1.40 |
| 50 | 5000 | 6787 | 1478 | 1.40 |

After flow of 50 hrs, minor traces of the diverter could be seen at the outlet of the cell and negligible undissolved diverter at the inlet of the cell.

Examples 8 and 9

The following designations are used in Examples 8-9.
Diverter System A: a 29/71 w/w mixture of solid phthalic anhydride diverter particulates, melting range of 268-270° F., and proppant;
Diverter System B: a 19/81 w/w mixture of solid polylactic acid diverter particulates, melting range: 268-356° F., and proppant.
The proppant in both Diverter System A and Diverter System B was a lightweight ceramic proppant having an apparent specific gravity of 2.61. The proppant was rated up to 15,000 psi closure stress. The solid diverter particulates of Diverter System A and Diverter System B were nearly the same particle sizes and distribution, the principal difference being the soluble particle shape: the diverter particulates of Diverter System A being more flake-like and the diverter particulates of Diverter System B being more spherical. The apparent density of the diverter particulates of Diverter System A and the diverter particulates of Diverter System B was approximately 1.24 g/cm³.

Example 8

Recognizing that the density difference between the soluble solid diverter particulates of Diverter System A and Diverter System B may affect the placement of the mixture inside the fracture at far-field locations, Example 8 demonstrates the requisite size limitations of the soluble solid diverter particulates and the proppant of Diverter System A and Diverter System B to minimize separation during placement downhole of the low-density soluble diverter particulates and the higher-density proppant.

A computational fluid dynamics (CFD) model was constructed using commercial CFD software to simulate the diverter flow inside the dimensions of a full-fracture for a far-field diversion application. The simulator used predicted the horizontal placement of the Divert System inside the fracture and the likely separation between low-density soluble diverter particulates and the higher-density proppant. The developed model had a geometry to simulate a transverse fracture with a dimension of 100 ft (height)×400 ft (length)×0.2 in. (width). The inlet flow to the fracture was through a 0.5-ft wellbore radius located at the center of geometry with a constant injection rate condition. The outflow condition was fixed at constant pressure in the right and left far boundary of the fracture. Factors such as particle size, particle density, proppant size, proppant density, carrier fluid density, carrier fluid viscosity, gravity effect, and bounce effect were all included in the numerical model. All injected fluids were assumed to behave as Newtonian fluids. In all runs, the size of the solid diverter particulates was 20 mesh. To determine the optimum proppant size that will not segregate from the dissolvable particles, the proppant size was tested at 20, 50, 70, and 100 mesh.

Figure 5A:
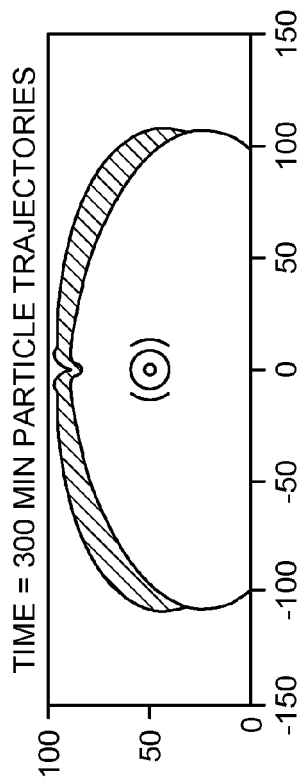
FIGS. 5A, 5B, 5C, 5D, 5E, 5F, 6A, 6B, 6C, 6D, 6E, 6F, 7A, 7B, 7C, 7D, 7E and 7F illustrate the effect of proppant particle size on the segregation of proppant and soluble diverter at defined conditions.
Figure 5B:
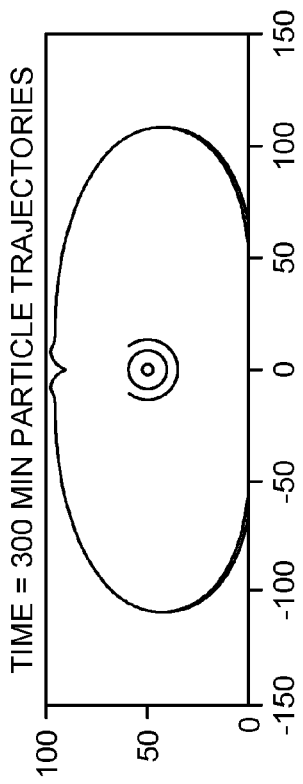
Figure 5C:
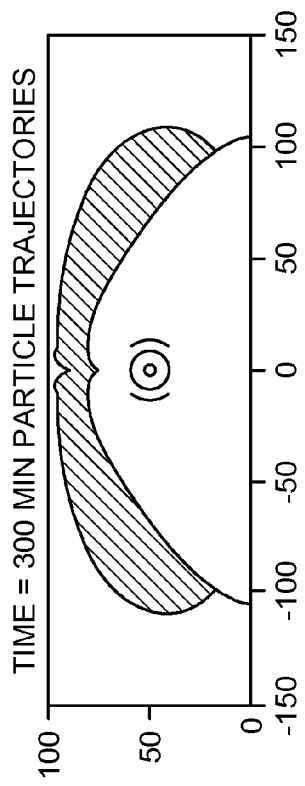
Figure 5D:
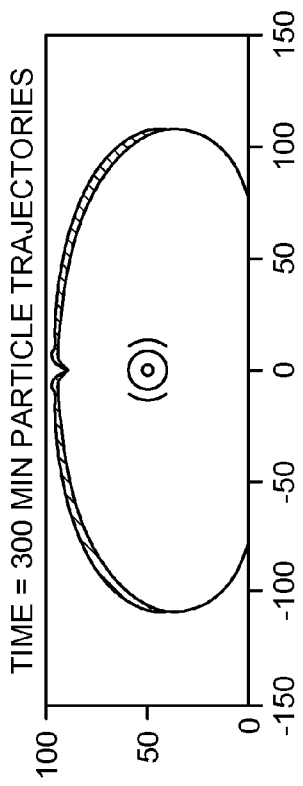
Figure 5E:
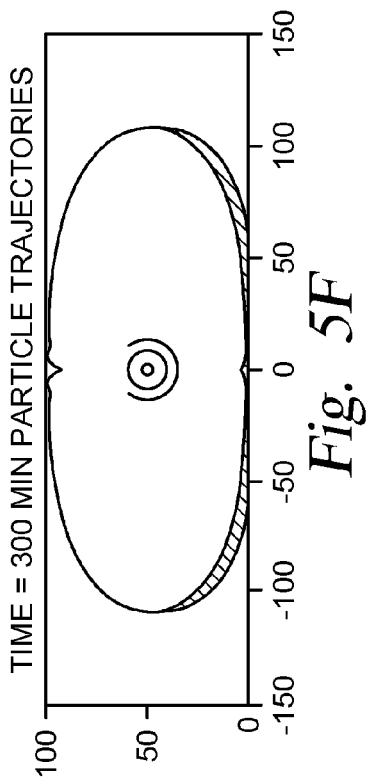
Figure 5F:
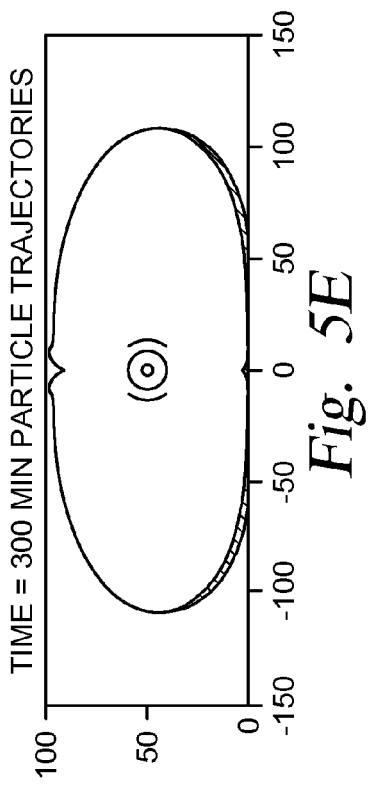

The effect of proppant particle size on the flow of the Divert Systems inside full fracture geometry was determined using an injection rate of 10 bpm/cluster and a carrier fluid viscosity of 10 cP. As shown in FIG. 5, separation between proppant and soluble diverter particulates occurred for proppant sizes of 20 (FIG. 5A) and 30 mesh (FIG. 5B). However, for 40 mesh (FIG. 5C), separation of proppant diverter particulates was minimized. For proppant size of 50 mesh (FIG. 5D) and above (shown as 70 mesh in FIG. 5E and 100 mesh in FIG. 5F), there was little, if any, separation between the soluble diverter particulates and proppant.

Figure 6A:
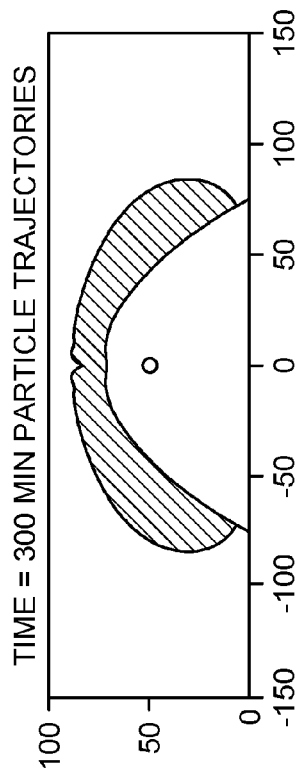
Figure 6B:
Figure 6C:
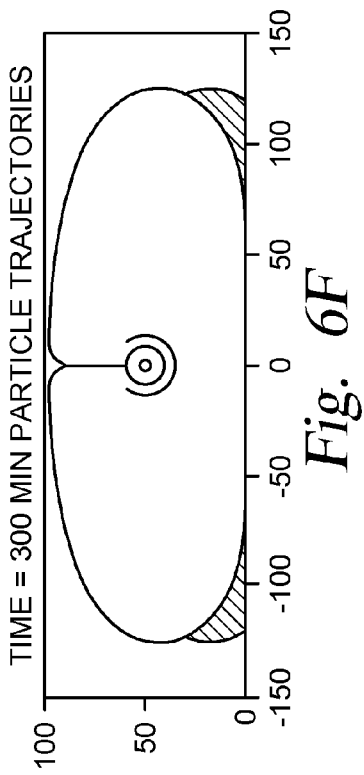
Figure 6D:
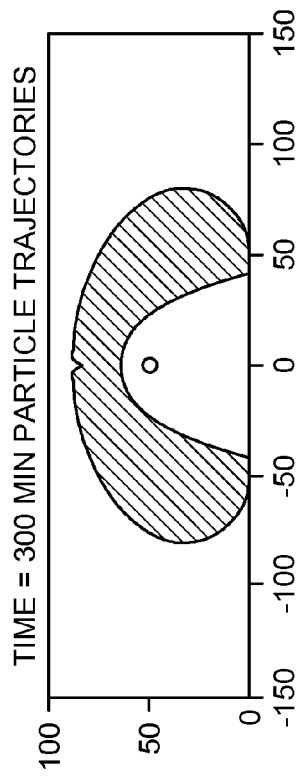
Figure 6E:
Figure 6F:
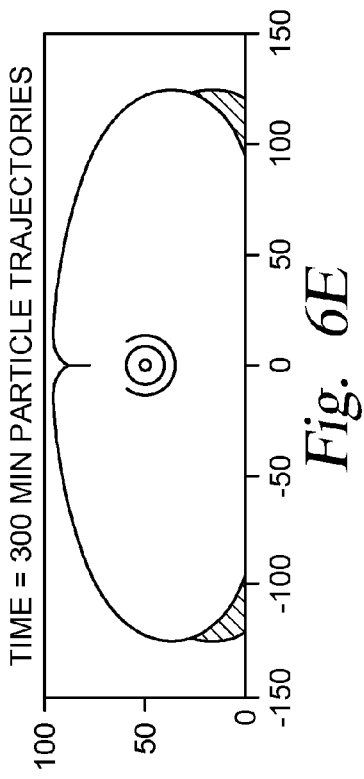
Figure 7A:
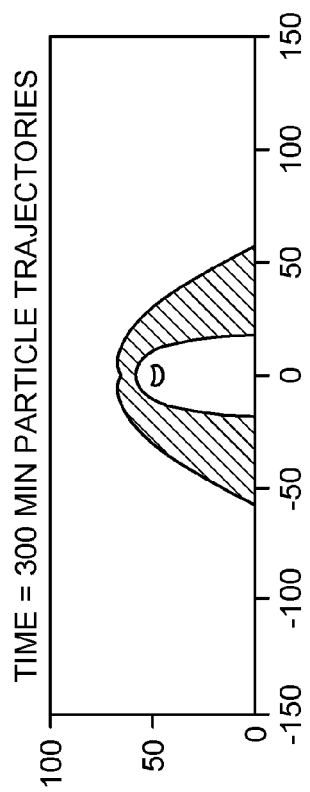
Figure 7B:
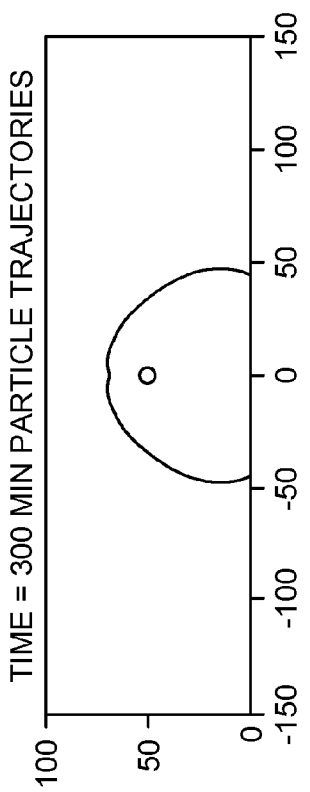
Figure 7C:
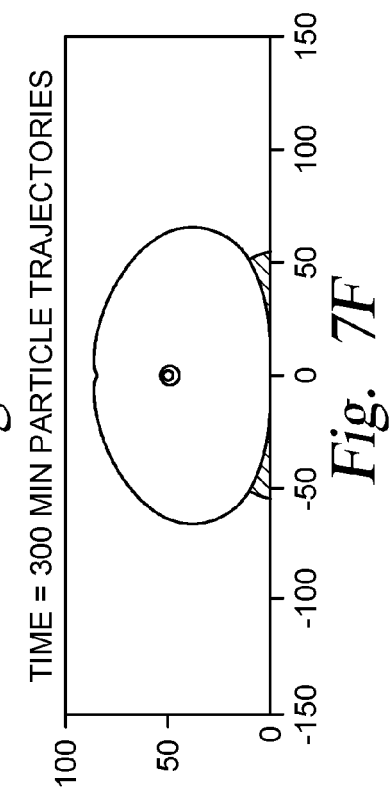
Figure 7D:
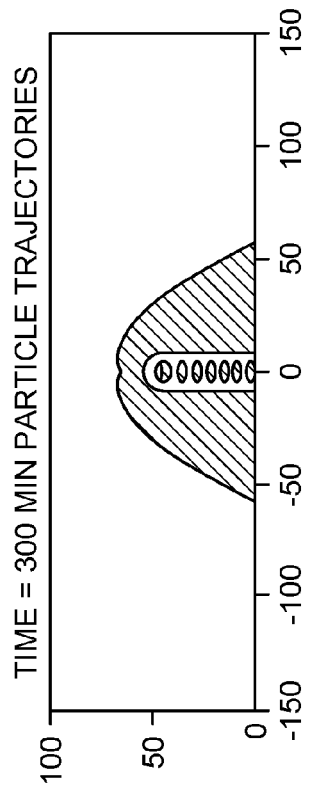
Figure 7E:
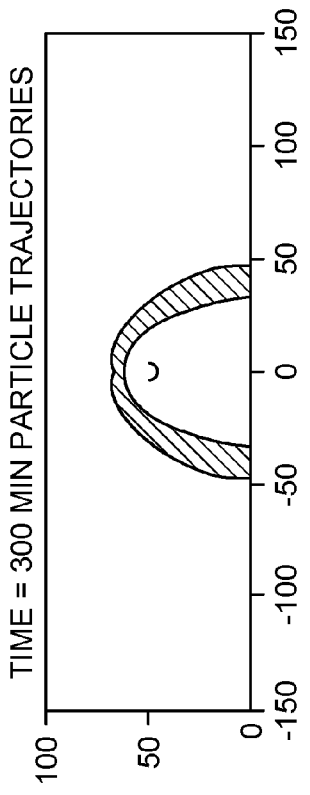
Figure 7F:
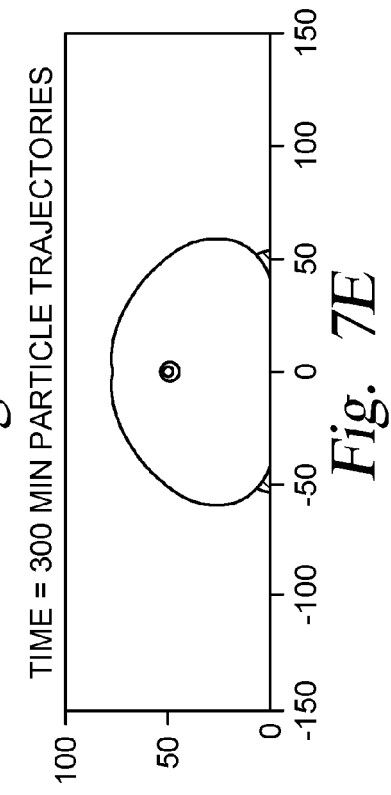
Figure 8A:
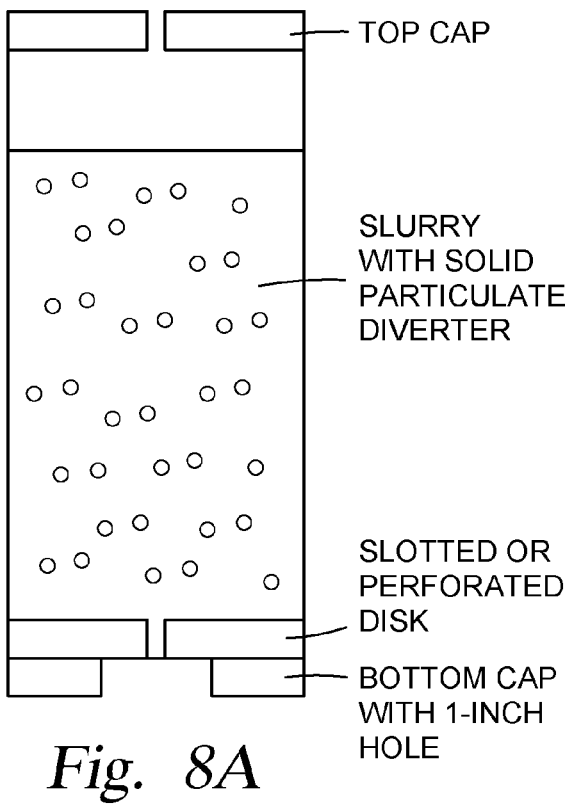
FIGS. 8A, 8B, 8C, 8D, 8E, 8F and 8G exemplify the testing apparatus used to determine fluid leak off.
Figure 8D:
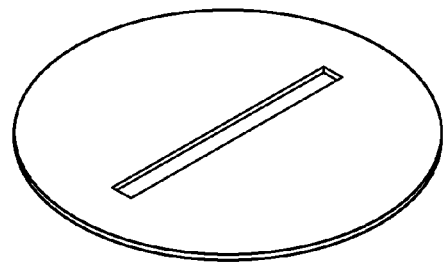
Figure 8E:
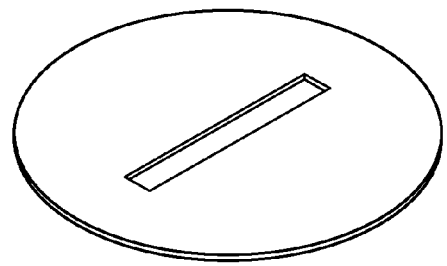
Figure 8B:
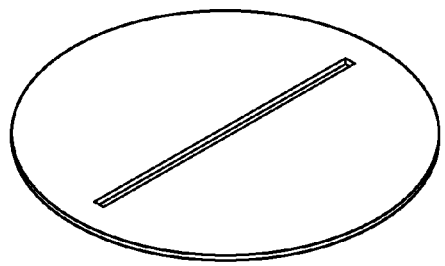
Figure 8F:
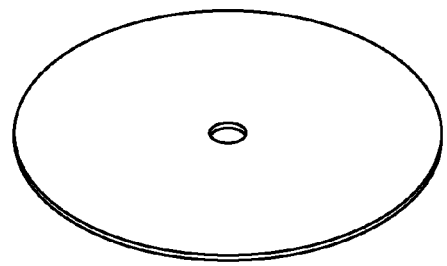
Figure 8C:
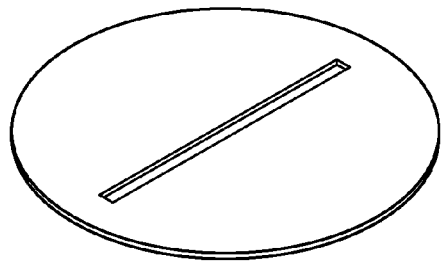
Figure 8G:
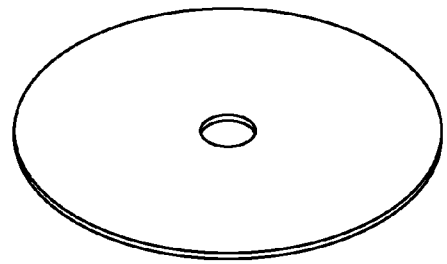

The effect of particle size of proppant on the flow of the Divert Systems inside full fracture geometry was then determined using a reduced injection rate of 3 bpm/cluster and carrier fluid viscosity of 10 cP, to highlight the effect of injection rate. As illustrated in FIG. 6, segregation between proppant and the soluble diverter particulates was noted for proppant sizes of 20 (FIG. 6A), 30 (FIG. 6B) and 40 mesh (FIG. 6C). However, for 50 mesh (FIG. 6D), no separation was noticed. Reducing proppant size to 70 (FIG. 6E) and 100 mesh (FIG. 6F) improved proppant suspension, resulting in higher vertical proppant coverage. However this does not constitute the segregation of particles because the area occupied by the soluble diverter particulates also contained the majority of proppant.

In the third set of runs, the injection rate was left at 3 bpm/cluster but the fluid viscosity of the carrier fluid was reduced from 10 cP to 2 cP to highlight the effect of the viscosity of the carrier fluid. In all runs, the less viscous carrier fluid at 3 bpm/cluster was unable to place the soluble diverter particulates more than 50 ft from the wellbore at a low injection rate. This indicates that the viscosity of the carrier fluid must be a minimum of 2 cP in order to carry the relatively lightweight soluble diverter particulates to the far-field locations. With a fluid viscosity of 10 cP, the soluble diverter particulates could be carried at least about 130 feet from the wellbore.

FIG. 7 shows separation between proppant and the soluble diverter particulates for proppant sizes of 20 (FIG. 7A), 30 (FIG. 7B) and 40 mesh (FIG. 7C) where the proppant settled faster and closer to the wellbore area. However, for 50 mesh (FIG. 7D), no separation was noticed between the solid diverter particulates and proppant. Reducing the size of proppant to 70 (FIG. 7E) and 100 mesh (FIG. 7F) made the proppant more transportable than the larger (20 mesh) soluble diverter particulates, increasing vertical proppant coverage. It was determined that at a low injection rate, slickwater fluid of 2 cP viscosity may not be able to transport even the low density soluble diverter particles for far-field application.

FIGS. 3-7 demonstrates that proppant sizes of 100 mesh (having a particle size distribution of 50/140 mesh or 70/140 mesh) provide the lowest far-field separation between proppant and 20 mesh soluble solid particulates particles under all tested conditions. In addition, reducing the proppant size to a larger mesh number improved proppant placement in the far-field area with good vertical coverage.

Example 9

Based on the results discussed, diverter solid particulates were selected to be in the medium size range (10 to 50 mesh) while proppant particles were selected to be in the fine size range (finer than 50 mesh) to illustrate (by conductivity reduction tests), the reduction in the flow rate due to particle pack permeability. A ceramic proppant was used having a particle distribution of 70/140 wherein more than 90% of the particles were in the 70/100 mesh. The ceramic proppant with 50 mesh solid particulates were able to flow through the surface equipment and downhole fracture with similar velocity.

In addition, the Example illustrates the bridging capabilities of the solid particulate diverters inside the fracture as a function of fracture width (0.04 to 0.08 inches). FIG. 8 simulates the ability of the solid diverter particulates to bridge across fractures as slots or perforations with widths ranging from 0.04 to 0.4 in. (show as 0.04 in. slot in FIG. 8B, 0.08 inch slot in FIG. 8C, 0.12 inch slot in FIG. 8D, 0.20 inch slot in FIG. 8E, 0.20 inch perforation in FIG. 8F and 0.4 inch perforation in FIG. 8G) a viscoelastic based carrier fluid having a viscosity of 200 cP at 100 $s^{-1}$ to prevent settling during static condition. The slurry of carrier fluid and solid particulate diverters was injected into the cylinder (shown as FIG. 8A) where it contacted a steel disk having a slot to simulate a fracture width or a hole to simulate perforations. Until the particulates bridge across the opening in the disk, the fluid flowed out of the cylinder through a 1-in, hole which was is much larger than any of the slotted discs. The slurry with the solid diverter particulates flowed from the cell into a beaker on a balance that is connected to a data acquisition system to record the mass rate as a function of time. At the start there was no pressure and the slurry flowed only by gravity until bridging occurred. When the solid diverter particulates bridged the slot, pressure (up to 1000 psi) was applied incrementally.

Figure 9:
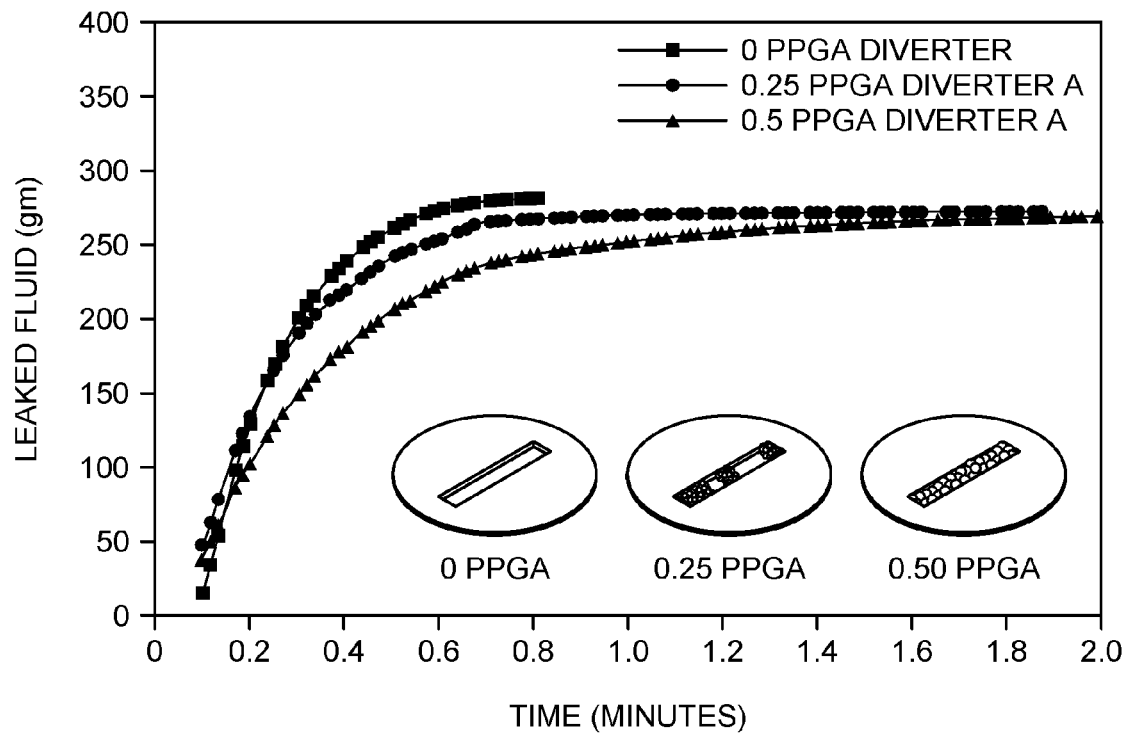
FIGS. 9, 11, 12 and 13 illustrate the effect of concentration of diverter particulates in Divert Systems defined herein on fluid leaking as a function of time.

FIG. 9 demonstrates the bridging ability of Divert System A for a slot size of 0.04 in. at loadings of solid diverter particulates of 0, 0.25 and 0.5 parts per gallon added (ppga) and the effect of concentration of the solid diverter particulates in Divert System A on fluid leaking through the slot as a function of time. No particle bridging was observed up to a loading of 0.25 ppga of Divert System A. However, for loading of 0.5 ppga, the majority of the solids were located at the inlet of the slot after the particles plugged the slot.

Figure 10:
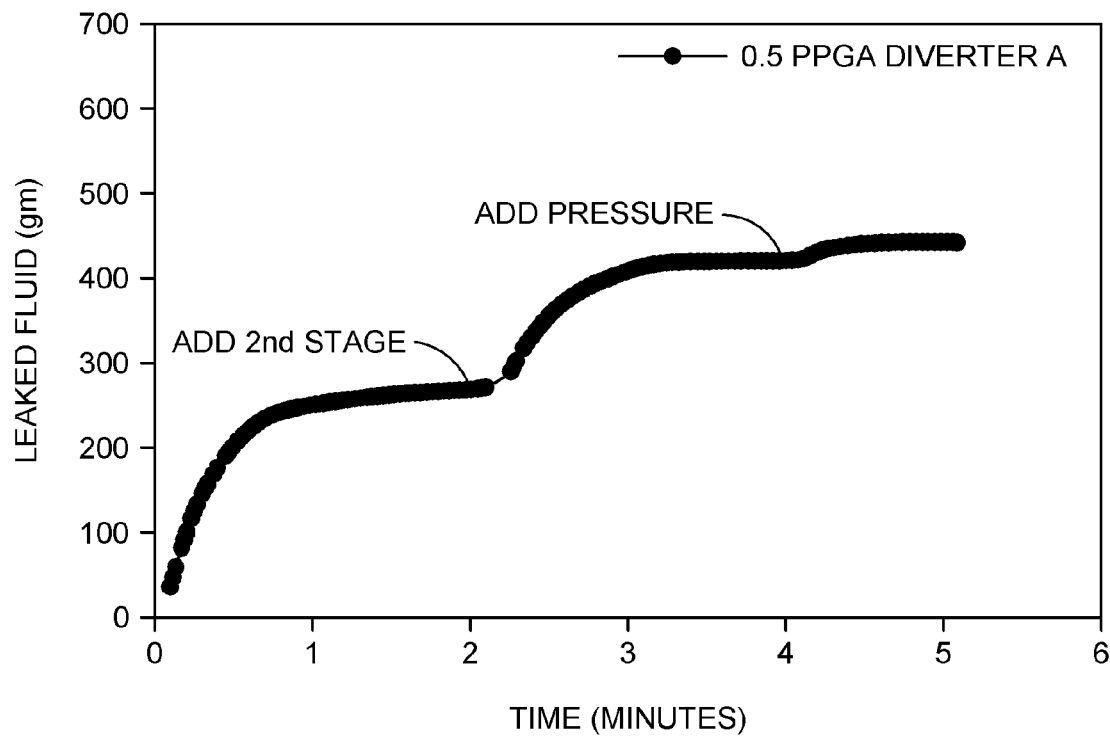
FIG. 10 illustrates the effect of increasing fluid volume and pressure on fluid leaking through a 0.04 inch slot as a function of time of a Diverter System defined herein.
Figure 11:
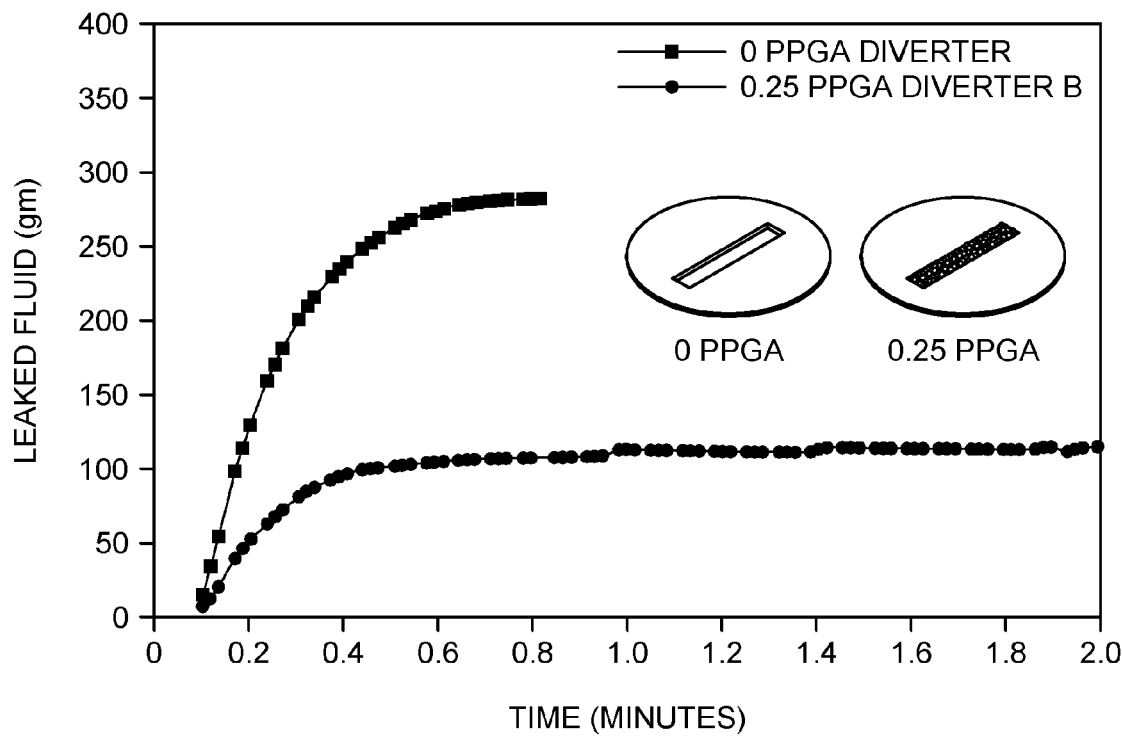

To confirm the bridging of the solid diverter particulates inside the 0.04-in, slot, a second stage of Divert System A was injected with the same loading of solid particulates of 0.5 ppga followed by increasing the pressure to 80 psi/in. The effect of increasing the fluid volume and pressure on fluid leaking through the slot is illustrated in FIG. 10. After adding the second stage, leaked fluid increased by 155 g (from 265 to 420 g). This increase in fluid was less than what is noted for the first stage (265 g). By adding pressure, the fluid leak off was slightly increased to 440 g. This confirms the ability of Divert System A to bridge the 0.04-in. slot at a loading of 0.5 ppga. Similar results were obtained for Diverter B. FIG. 11 illustrates the effect of concentration of the solid diverter particulates on fluid leaking through the 0.04-inch slot. For Divert System B, a loading of 0.25 ppga was enough to bridge and plug the 0.04-in slot. This indicates that the spherical shape of the solid particulates of Divert System B helps to bridge inside the fracture more than the flake shape of solid particulates of Divert System A.

Figure 12:
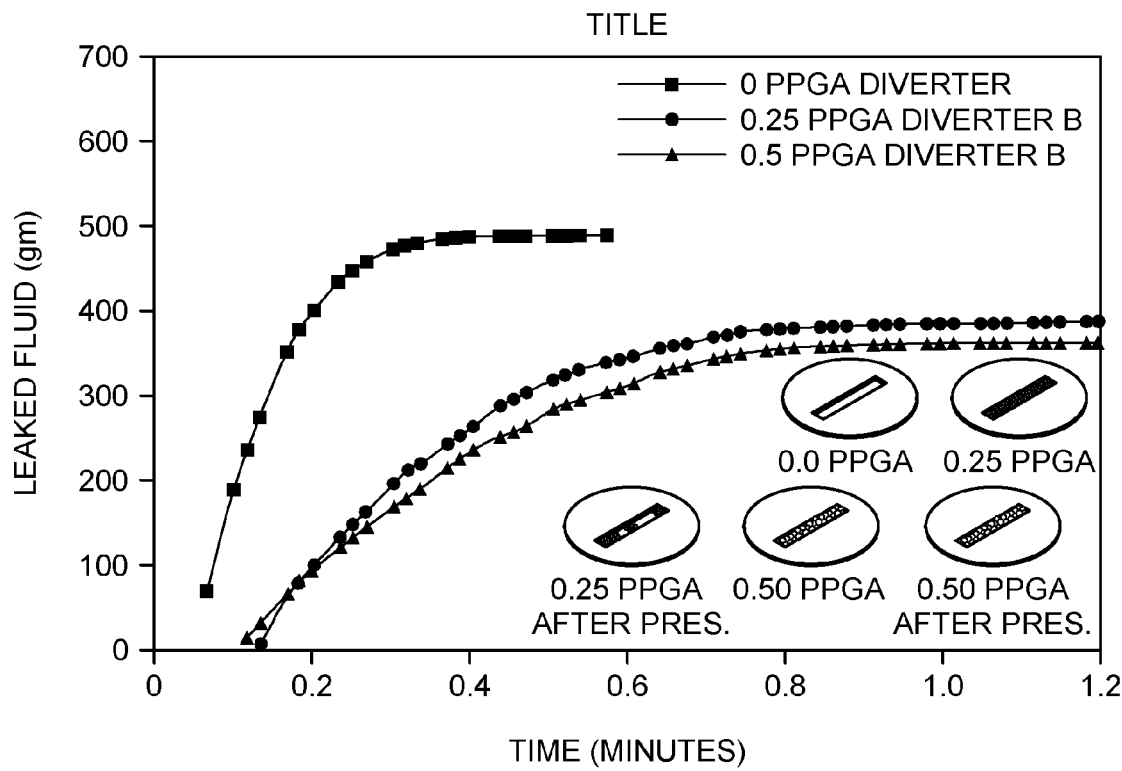
Figure 13:
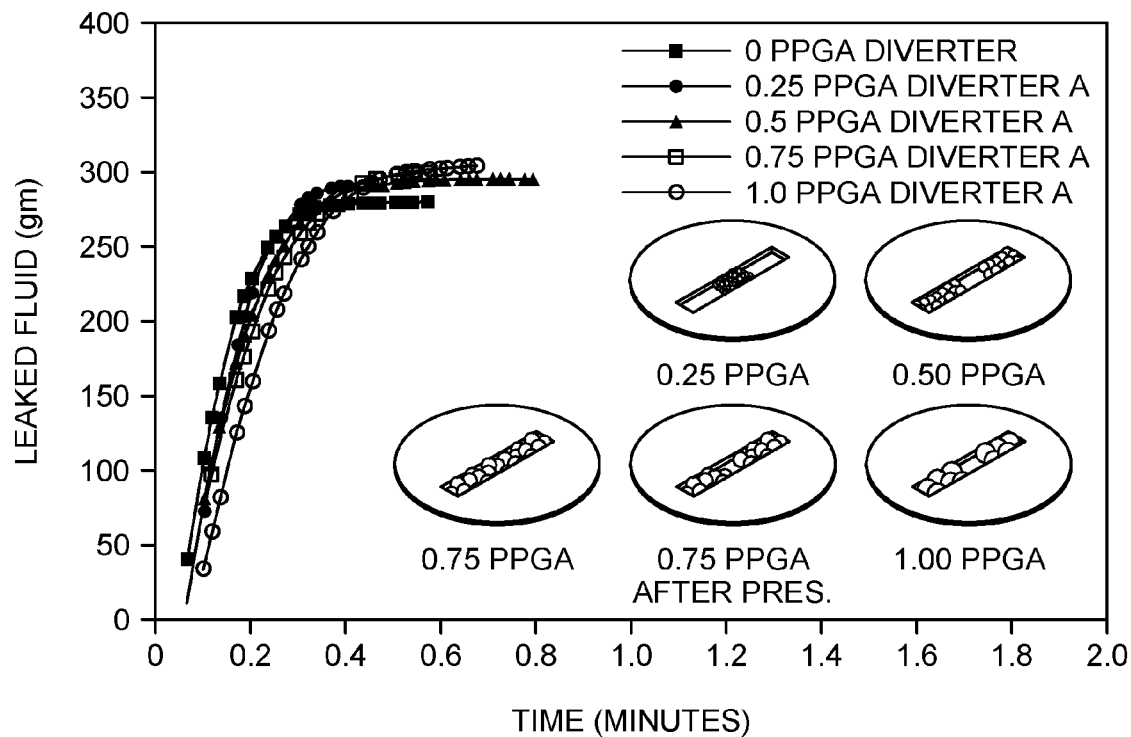

FIG. 12 shows the effect of concentration of solid diverter particulates in Divert System B on fluid leak-off as a function of time through a 0.08-in, slot width. Both 0.25 and 0.5 ppga loadings of the solid particulate in Divert System B were enough to bridge inside the slot and reduce the leaked fluid volume. However, if pressure was applied, only a loading of 0.5 ppga was strong enough to keep bridging inside the slot. On the other hand, the solid particulates of Divert System A were unable to bridge inside the 0.08-in slot until a loading of 1 ppga was achieved. This is illustrated in FIG. 13.

Example 10

Reduction in conductivity of Divert System A and Divert System B was used to demonstrate the ability of the systems to build a low-permeability pack that achieves diversion. Referring to FIG. 8, 0.04-in. and 0.08-in, slotted discs were used to determine the reduction in the flow rate due to the particle pack permeability. Constant injection pressure conditions from 100 to 1000 psi were used. The mass flow rate was measured by recording the mass of leaked fluid as a function of time using a beaker on a balance. Oil with viscosity of 100 cP (exhibiting Newtonian behavior) was initially passed through the disc without any particles to determine the baseline flow rate. Solid particles with a concentration of 1 ppga were then mixed with the VES-based carrier fluid of 200 cP viscosity at 100 s$^{-1}$ to eliminate settling during static conditions and injected to bridge in the top of the slot disc. Oil exhibiting a viscosity of 100 cP was injected through the bridged particle pack. The reduction in the oil flow rate with and without the particles pack was plotted and the reduction in conductivity was calculated. From this activity, the linear relationship between the leaked fluid and time was obtained and the slope of the line represented the conductivity of the slot. The high viscosity of the oil allowed it to flow slower, thereby increasing the accuracy of the measurements.

Figure 14:
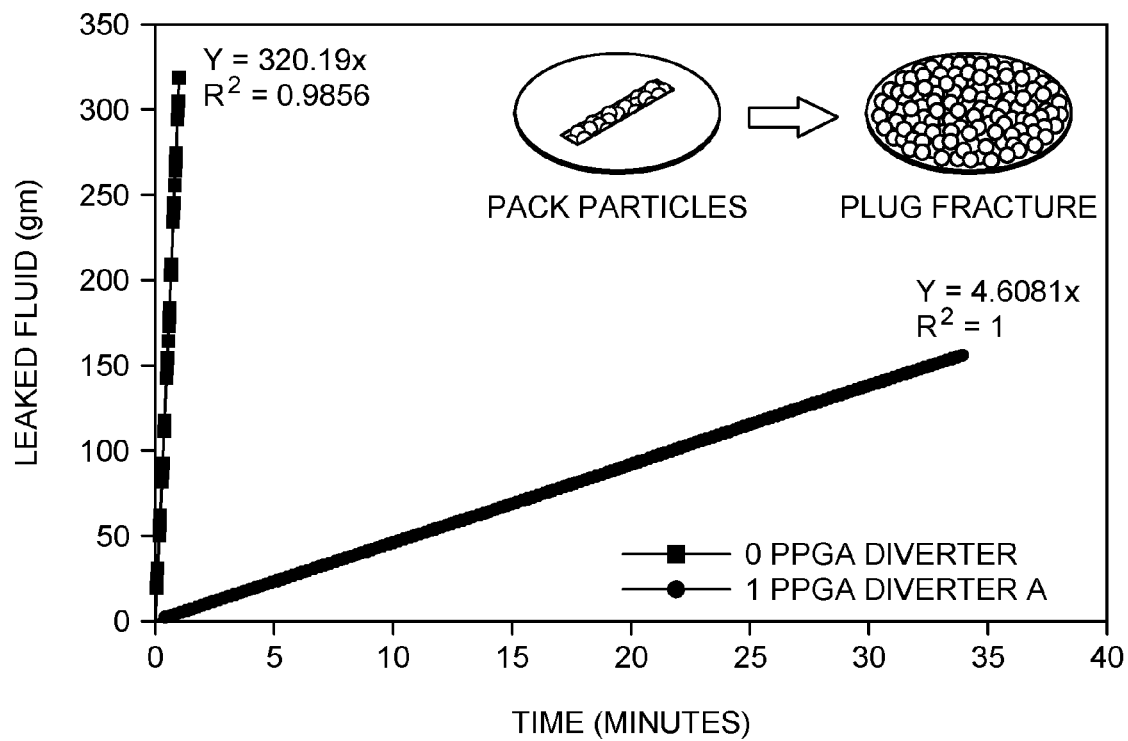
FIGS. 14, 15, 16 and 17 demonstrates reduction in conductivity and plugging of a fracture using Divert Systems defined herein.

FIG. 14 shows a comparison in the leaked flow as a function of time through a 0.04-in, slot width where a high-viscosity oil (100 cP) was pumped twice: once without the Divert System A as a baseline and a second time with Divert System (1 ppga). In both cases, a straight line was obtained between the leaked volume and the time. The slope of this line represents the conductivity of the slot. The reduction in the slope therefore from 320.19 (in the case of no Divert System A) to 4.608 (in the case of 1 ppga Divert System A), is a good indication that the diverter particulates were able to plug the fracture and reduce conductivity.

Figure 15:
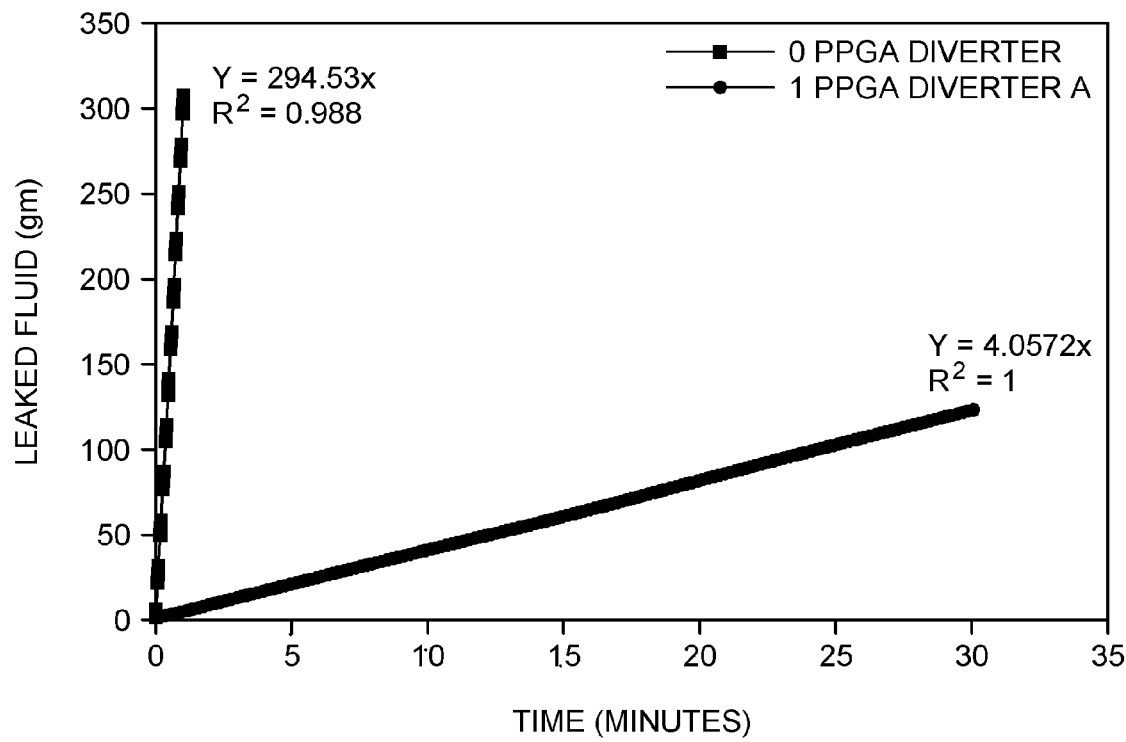
Figure 16:
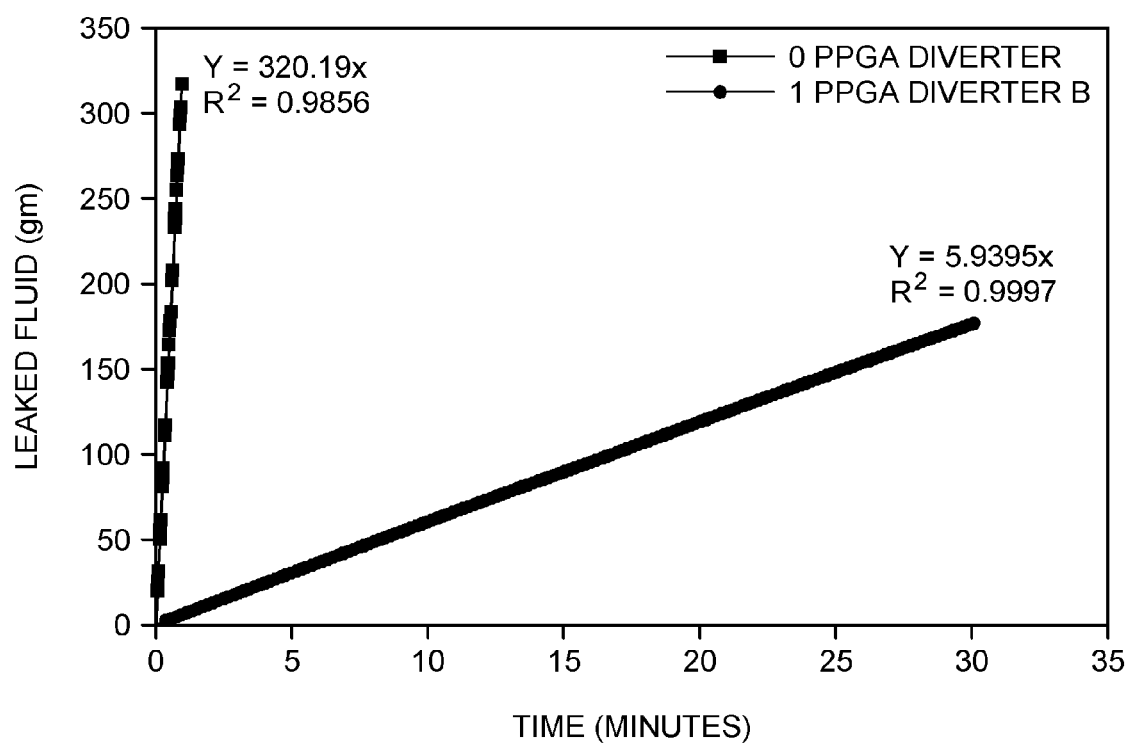
Figure 17:
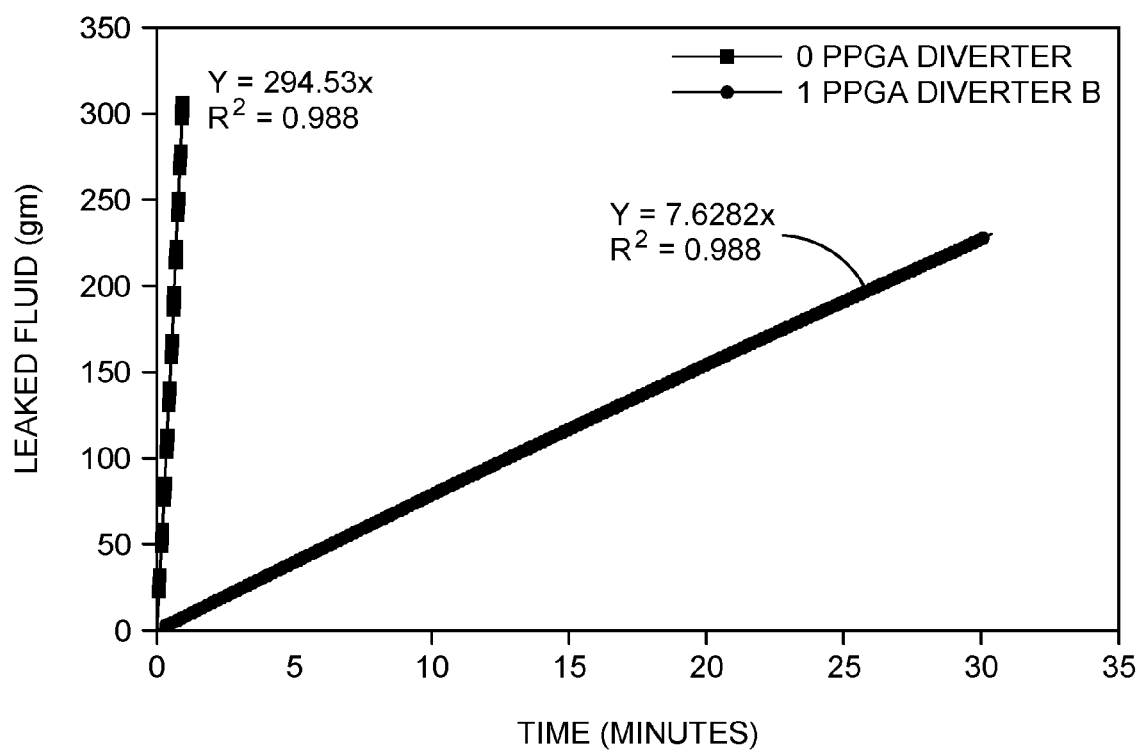

FIG. 15, FIG. 16 and FIG. 17 show similar results were obtained for Divert System A through the 0.08-in. slot, Divert System B through the 0.04-in, slot and Divert System B through the 0.08-in, slot, respectively. Table VIII shows a summary of the conductivity reduction of Divert System A and Divert System B for far-field applications with 0.04-in. and 0.08-in, slot widths.

TABLE VIII

| Type | Slot Width | Concentration, ppga | Conductivity Reduction, % |
| --- | --- | --- | --- |
| Diverter A | 0.04 in. (1 mm) | 1 | 98.6 |
| Diverter B | 0.04 in. (1 mm) | 1 | 98.1 |

TABLE VIII-continued

| Type | Slot Width | Concentration, ppga | Conductivity Reduction, % |
| --- | --- | --- | --- |
| Diverter A | 0.08 in. (2 mm) | 1 | 98.6 |
| Diverter B | 0.08 in. (2 mm) | 1 | 97.4 |

In summary, Examples 8 and 9 demonstrate that the mixture of soluble solid particles and proppant as defined ensure in far field diversion that the temporarily bridged fractures re-open and remain propped for hydrocarbon flow after the soluble material has fully dissolved. In particular, the data supports the conclusions that (i) proppant size of 50 mesh or higher minimized the far-field segregation between the proppant and 20 mesh soluble particles; (ii) reduction in proppant size to a larger mesh improved proppant placement inside the far-field area with good vertical coverage; the diverter particulates should be in the medium-size range (10 to 50 mesh) while the proppant particles should be in the fine-size range (70 to 140 mesh); (iii) at low injection rates, slickwater fluid (2 cP) may not have adequate transport properties to place soluble diverter particles for far-field applications; (iv) carrier fluid with viscosity of 10 cP carries the soluble diverter particulates and the proppant at least 130 ft. from the wellbore; (v) a loading of 0.5 ppga of Divert System A was needed to bridge and plug the 0.04-in, slot width, while only 0.25 ppga of Divert System B was needed to plug the same width; (vi) the spherical shape of the particulates of Divert System B helped to bridge inside the 0.04-in, fracture more than the flake shape of the particulates of Divert System A; and (vii) both Divert System A and Divert System B were able to significantly reduce the conductivity of the test slot discs.

The methods that may be described above or claimed herein and any other methods which may fall within the scope of the appended claims can be performed in any desired suitable order and are not necessarily limited to any sequence described herein or as may be listed in the appended claims. Further, the methods of the present disclosure do not necessarily require use of the particular embodiments shown and described herein, but are equally applicable with any other suitable structure, form and configuration of components.

While exemplary embodiments of the disclosure have been shown and described, many variations, modifications and/or changes of the system, apparatus and methods of the present disclosure, such as in the components, details of construction and operation, arrangement of parts and/or methods of use, are possible, contemplated by the patent applicant(s), within the scope of the appended claims, and may be made and used by one of ordinary skill in the art without departing from the spirit or teachings of the disclosure and scope of appended claims. Thus, all matter herein set forth or shown in the accompanying drawings should be interpreted as illustrative, and the scope of the disclosure and the appended claims should not be limited to the embodiments described and shown herein.

What is claimed is:

1. A method of stimulating the production of hydrocarbons from a subterranean formation penetrated by a wellbore, the method comprising:

(a) pumping an aqueous fluid having minimum viscosity of 2 cP into a high permeability zone of a primary far field fracture within a subterranean formation about 10 feet to about 3,000 feet from from the wellbore, the aqueous fluid having a divert system comprising (i) dissolvable diverter particulates having a particle size from about 4 to 50 about mesh and (ii) proppant having a particle size range between from about 40 to about 325 mesh and an apparent specific gravity greater than or equal to 1.05, wherein at least a portion of the dissolvable diverter particulates of the divert system comprise at least one compound of the formula:

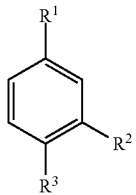

(III)

or an anhydride thereof wherein:
$R^1$ is —COO—$(R^5O)_y$—$R^4$ or —H;
$R^2$ and $R^3$ are selected from the group consisting of —H and —COO—$(R^5O)_y$—$R^4$, provided both $R^2$ and $R^3$ are —COO—$(R^5O)_y$—$R^4$ when $R^1$ is —H and further provided only one of $R^2$ or $R^3$ is —COO—$(R^5O)_y$—$R^4$ when $R^1$ is —COO—$(R^5O)_y$—$R^4$;
$R^4$ is —H or a $C_1$-$C_6$ alkyl group;
$R^5$ is a $C_1$-$C_6$ alkylene group; and
each y is 0 to 5;
(b) propping open at least a portion of the high permeability zone with at least a portion of the proppant in the divert system and blocking at least a portion of the high permeability zone with at least a portion of the diverter particulates;
(c) pumping a second fluid into the subterranean formation and into a fracture secondary to the primary fracture, the secondary fracture having lower permeability zone than the primary fracture;
(d) dissolving at least a portion of the diverter particulates blocking at least a portion of the high permeability zone; and
(e) producing hydrocarbons from the high permeability zone and the lower permeability zone.

2. The method of claim 1, wherein the downhole temperature of the wellbore is between from about 80° F. to about 400° F.

3. The method of claim 2, wherein the downhole temperature of the wellbore is between from about 80° F. to about 250° F.

4. The method of claim 1, wherein the apparent density of the dissolvable diverter particulates is greater than or equal to 1.2 g/cc.

5. The method of claim 1, wherein the apparent specific gravity of the proppant is greater than or equal to 2.60.

6. The method of claim 5, wherein the proppant is sand.

7. The method of claim 5, wherein the proppant is a porous ceramic.

8. The method of claim 1, wherein the weight ratio of the diverter particulates to proppant in the divert system is from about 5:95 to about 95:5.

9. The method of claim 1, wherein the fluid of step (c) contains a proppant having an apparent specific gravity greater than or equal to 1.05.

10. The method of claim 1, wherein the fluid of step (c) further contains a dissolvable diverter.

11. The method of claim 10, wherein the diverter particulates of the divert system and the dissolvable diverter of step (c) are of the same composition.

12. The method of claim 1, wherein at least a portion of the diverter particulates of the divert system are phthalic anhydride.

13. The method of claim 1, wherein the diverter particulates of the divert system further comprise an aliphatic polyester having the general formula of repeating units:

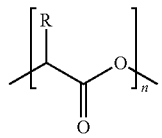

where n is an integer between 75 and 10,000 and R is selected from the group consisting of hydrogen, alkyl, aryl, alkylaryl, acetyl, heteroatoms, and mixtures thereof; and the aliphatic polyester is poly(lactide).

14. The method of claim 13, wherein the aliphatic polyester is polylactic acid.

15. The method of claim 13, wherein the at least a portion of the diverter particulates is polylactic acid.

16. The method of claim 13, wherein the downhole temperature of the wellbore is between from about 225° F. to about 400° F.

17. The method of claim 1, wherein the subterranean formation is sandstone or carbonate.

18. A method of enhancing the productivity of hydrocarbons from a well penetrating a subterranean formation, the method comprising:
(a) pumping an aqueous fluid having minimum viscosity of 2 cP into the subterranean formation at a pressure sufficient to create or enhance a primary fracture far field from the wellbore, the aqueous fluid being a first fluid comprising a divert system having (i) dissolvable diverter particulates having a particle size from about 4 to about 50 mesh and an apparent density from about 1.2 to about 1.75 g/cc and (ii) proppant having a particle size range between from 40 to about 325 mesh and an apparent specific gravity greater than or equal to 1.05, wherein at least a portion of the dissolvable diverter particulates of the divert system comprise at least one compound of the formula:

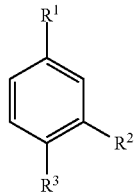

(III)

or an anhydride thereof wherein:
$R^1$ is —COO—$(R^5O)_y$—$R^4$ or —H;
$R^2$ and $R^3$ are selected from the group consisting of —H and
—COO—$(R^5O)_y$—$R^4$, provided both $R^2$ and $R^3$ are —COO—$(R^5O)_y$—$R^4$ when $R^1$ is —H and further provided only one of $R^2$ or $R^3$ is —COO—$(R^5O)_y$—$R^4$ when $R^1$ is —COO—$(R^5O)_y$—$R^4$;
$R^4$ is —H or a $C_1$—$C_6$ alkyl group;
$R^5$ is a $C_1$-$C_6$ alkylene group; and
each y is 0 to 5;
(b) flowing the first fluid into a high permeability zone of the primary fracture, propping at least a portion of the high permeability zone with the proppant of the divert system and blocking at least a portion of the high permeability zone with the diverter particulates;

(c) pumping a second fluid into a lower permeability zone of a fracture which is secondary to the primary fracture, the secondary fracture having a directional orientation distinct from the directional orientation of the primary fracture;
(d) dissolving at least a portion of the diverter particulates blocking at least a portion of the high permeability zone far field from the wellbore at in-situ reservoir conditions; and
(e) producing fluid from the high permeability zone and the lower permeability zone.

19. The method of claim 18, wherein at least a portion of the dissolvable diverter particulates are phthalic anhydride, terephthalic anhydride, phthalic acid, terephthalic acid, a polylactic acid or a mixture thereof.

20. A method of stimulating a subterranean formation penetrated by a wellbore, the method comprising:
(a) pumping a first fluid into a primary fracture far field from the wellbore, the first fluid comprising a divert system having (i) diverter particulates, dissolvable in-situ at conditions for producing fluid from the well, the diverter particulates having a particle size from about 4 to about 50 mesh and an apparent density between from about 1.2 to about 1.75 g/cc and (ii) proppant having a particle size range between from 40 to about 325 mesh and an apparent specific gravity greater than or equal to 1.05, wherein at least a portion of the dissolvable diverter particulates of the divert system comprise at least one compound of the formula:

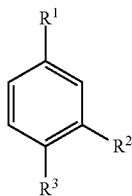

(III)

or an anhydride thereof
wherein:
$R^1$ is —COO—$(R^5O)_y$—$R^4$ or —H;
$R^2$ and $R^3$ are selected from the group consisting of —H and —COO—$(R^5O)_y$—$R^4$, provided both $R^2$ and $R^3$ are —COO—$(R^5O)_y$—$R^4$ when $R^1$ is —H and further provided only one of $R^2$ or $R^3$ is —COO—$(R^5O)_y$—$R^4$ when $R^1$ is —COO—$(R^5O)_y$—$R^4$;
$R^4$ is —COO—H or a $C_1$-$C_6$ alkyl group;
$R^5$ is a $C_1$-$C_6$ alkylene group; and
each y is 0 to 5;
(b) flowing the divert system into a high permeability zone within the far field primary fracture, propping at least a portion of the high permeability zone with the proppant of the divert system and blocking at least a portion of the high permeability zone with the diverter particulates of the divert system;
(c) pumping a second fluid into a fracture secondary to the primary fracture far field wherein the primary fracture and the secondary fracture create a fracture network and wherein the secondary fracture has lower permeability zone than the primary far field fracture;
(d) dissolving at least a portion of the diverter particulates blocking at least a portion of the high permeability zone; and
(e) producing fluid from the high permeability and low permeability zones.

21. The method of claim 20, wherein at least a portion of the diverter particulates are phthalic anhydride, terephthalic anhydride, phthalic acid, terephthalic acid, a polylactic acid or a mixture thereof.

22. The method of claim 20, wherein the weight ratio of the diverter particulates to proppant in the divert system is from about 5:95 to about 95:5.

23. The method of claim 20, wherein the diverter particulates of the divert system further comprise an aliphatic polyester having the general formula of repeating units:

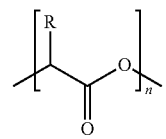

where n is an integer between 75 and 10,000 and R is selected from the group consisting of hydrogen, alkyl, aryl, alkylaryl, acetyl, heteroatoms, and mixtures thereof; and the aliphatic polyester is poly(lactide).

* * * * *

UNITED STATES PATENT AND TRADEMARK OFFICE
CERTIFICATE OF CORRECTION

PATENT NO. : 9,938,811 B2  
APPLICATION NO. : 15/217684  
DATED : April 10, 2018  
INVENTOR(S) : Naima Bestaoui-Spurr et al.

Page 1 of 1

It is certified that error appears in the above-identified patent and that said Letters Patent is hereby corrected as shown below:

In the Claims

Column 24, Line 65, Claim 1: Delete the second occurrence of "from".

Column 25, Line 34, Claim 1: Insert --a-- after "...fracture having...".

Column 26, Line 60, Claim 18, should read: $R^4$ is –H or a $C_1$—$C_6$ alkyl group;

Column 28, Line 5, Claim 20, Delete: "—COO".

Signed and Sealed this  
Tenth Day of July, 2018

Andrei Iancu  
*Director of the United States Patent and Trademark Office*